US010577775B2

(12) United States Patent
Miyamoto et al.

(10) Patent No.: US 10,577,775 B2
(45) Date of Patent: Mar. 3, 2020

(54) WORK VEHICLE

(71) Applicant: Komatsu Ltd., Tokyo (JP)

(72) Inventors: Hirofumi Miyamoto, Tokyo (JP); Yohei Seto, Tokyo (JP)

(73) Assignee: Komatsu Ltd., Tokyo (JP)

( * ) Notice: Subject to any disclaimer, the term of this patent is extended or adjusted under 35 U.S.C. 154(b) by 45 days.

(21) Appl. No.: 15/533,104

(22) PCT Filed: Dec. 28, 2016

(86) PCT No.: PCT/JP2016/089072
§ 371 (c)(1),
(2) Date: Jun. 5, 2017

(87) PCT Pub. No.: WO2018/123007
PCT Pub. Date: Jul. 5, 2018

(65) Prior Publication Data
US 2018/0266075 A1    Sep. 20, 2018

(51) Int. Cl.
*E02F 9/24*      (2006.01)
*E02F 9/08*      (2006.01)
(Continued)

(52) U.S. Cl.
CPC ............ *E02F 9/0833* (2013.01); *B60K 11/02* (2013.01); *B60R 3/005* (2013.01); *B66C 13/52* (2013.01);
(Continued)

(58) Field of Classification Search
CPC ........ B60R 3/005; B60R 19/52; E02F 9/0833; E02F 9/0891; E02F 9/0866; E01F 13/06
See application file for complete search history.

(56) References Cited

U.S. PATENT DOCUMENTS 3,622,174 A * 11/1971 Wakeen ................. B60R 19/52
                                                                  280/760
5,071,185 A * 12/1991 Schiele ..................... B60P 3/42
                                                                  16/261
(Continued)

FOREIGN PATENT DOCUMENTS

JP             3005977 U     1/1995
JP         2001-055761 A     2/2001
(Continued)

OTHER PUBLICATIONS

Komatsu Technical Report; FY2010 vol. 56, No. 163, Published Feb. 12, 2011; Introduction of Products Introduction of Large-sized Wheel Loader WA 1200-6, retrieved Mar. 4, 2019 from http://www.komatsu.com/CompanyInfo/profile/report/#c10 (Year: 2011).*

(Continued)

*Primary Examiner* — James A Shriver, II
*Assistant Examiner* — Steve Clemmons
(74) *Attorney, Agent, or Firm* — Locke Lord LLP

(57) ABSTRACT

A work vehicle includes a vehicle body which has a passage including a rear passage, and a movable fence rotatably supported to the vehicle body around a rotation axis which extends in a vertical direction between a normal position which extends in a width direction of the vehicle body along a rear edge of the rear passage and a retreat position which extends backward from the vehicle body.

19 Claims, 11 Drawing Sheets

(51) Int. Cl.
  *B66C 13/52* (2006.01)
  *B60R 3/00* (2006.01)
  *B60K 11/02* (2006.01)
  *E02F 3/28* (2006.01)

(52) U.S. Cl.
  CPC .......... *E02F 9/0866* (2013.01); *E02F 9/0891* (2013.01); *E02F 3/283* (2013.01)

(56) References Cited

U.S. PATENT DOCUMENTS

| | | | | |
|---|---|---|---|---|
| 6,536,824 | B2* | 3/2003 | Anderson | B62D 27/00 296/186.4 |
| 8,186,751 | B2* | 5/2012 | Davisdon | B60R 19/52 296/193.1 |
| 8,544,584 | B2* | 10/2013 | Takeda | E02F 9/26 165/41 |
| 8,893,834 | B2* | 11/2014 | Berkeland | B62D 25/12 180/68.1 |
| 2008/0006460 | A1* | 1/2008 | Giovannini | B62D 25/10 180/69.2 |
| 2012/0205195 | A1 | 8/2012 | Tsutsumi et al. | |
| 2014/0191537 | A1* | 7/2014 | Bilbruck | E02F 9/0833 296/193.07 |
| 2014/0353083 | A1* | 12/2014 | Samuel | B60R 3/005 182/87 |
| 2015/0136523 | A1 | 5/2015 | Madera et al. | |
| 2015/0246641 | A1* | 9/2015 | Jayapalan | B60R 3/005 182/113 |
| 2015/0291100 | A1* | 10/2015 | Koshy | B60R 3/005 280/727 |
| 2016/0312436 | A1* | 10/2016 | Nowak | E02F 9/0841 |

FOREIGN PATENT DOCUMENTS

| | | | | |
|---|---|---|---|---|
| JP | 2003-040587 | A | | 2/2003 |
| JP | 2004-142597 | A | | 5/2004 |
| JP | 2004-344815 | A | | 12/2004 |
| JP | 2010058614 | A | * 3/2010 | ............ B60R 19/52 |
| JP | 2010-189869 | A | | 9/2010 |
| JP | 2012-202071 | A | | 10/2012 |
| JP | 2014-001073 | A | | 1/2014 |
| JP | 5786582 | B2 | | 9/2015 |
| JP | 2015-178758 | A | | 10/2015 |
| JP | 2016-131824 | A | | 7/2016 |
| WO | 2012/035848 | A1 | | 3/2012 |
| WO | 2016/183620 | A1 | | 11/2016 |

OTHER PUBLICATIONS

Keepe 89322 Straight Trailer Stake Pocket; amazon.com internet sales page retrieved Jul. 11, 2019 https://www.amazon.com/Keeper-89322-Straight-Trailer-Pocket/dp/B00C5SMRAG; via Internet Archive Wayback Machine dated Mar. 23, 2015 (Year: 2015 ).*
Peugeot: "Peugeot Boxer"., Jan. 1, 2015, pp. 1-17, XP055492377, Pinley House, 2 SunbeamWay, Coventry, CV3 1ND Retrieved from the Internet: URL:http://www.jarvieplant.co.uk/wp-content/uploads/2015/06/peugeot-boxer-van-range-brochure.pdf (cited in the in the Jul. 31, 2018 Search Report issued in EP16869372.9).

* cited by examiner

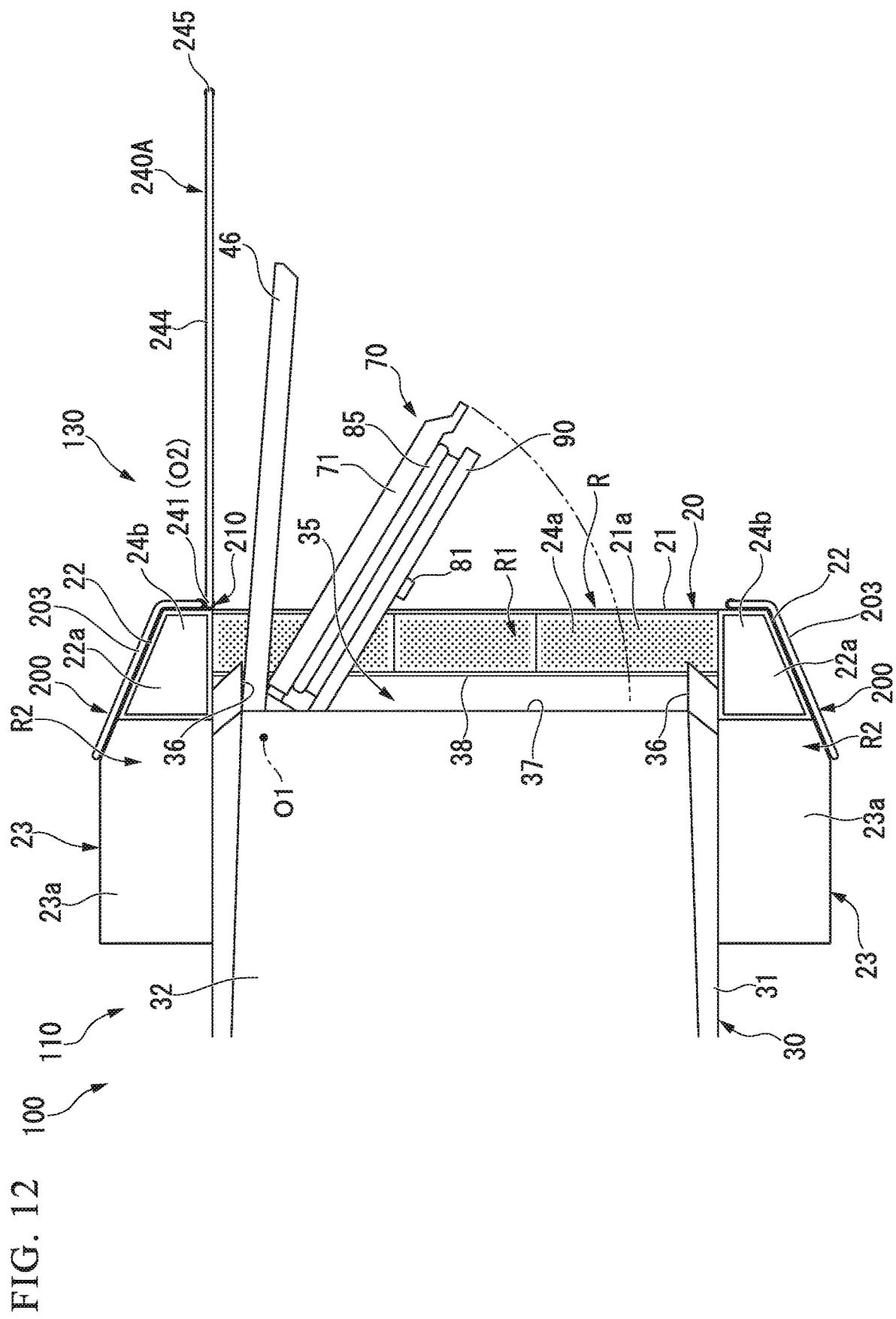

WORK VEHICLE

TECHNICAL FIELD

The present invention relates to a work vehicle.

Background Art

Patent Document 1 discloses a wheel loader in which a fence is provided in a passage of a vehicle body as an example of a work vehicle.

CITATION LIST

Patent Literature

[Patent Document 1] PCT International Publication No. WO 2012/035848

SUMMARY OF INVENTION

Technical Problem

For example, in a case where a worker performs work in a rear passage, a fence may interfere with the work. Accordingly, it is necessary to remove the fence, which makes the work complicated.

The present invention is made in consideration of the above-described problem, and an object thereof is to provide a work vehicle in which maintainability can be improved.

Solution to Problem

According to an aspect of the present invention, a work vehicle includes: a vehicle body that has a passage including a rear passage; and a movable fence that is rotatably supported to the vehicle body around a rotation axis extending in a vertical direction between a normal position which extends in a width direction of the vehicle body along a rear edge of the rear passage and a retreat position which extends backward from the vehicle body.

According to this configuration, it is possible to prevent the movable fence from interfering with work on the rear passage by rotating the movable fence from the normal position to the retreat position.

Advantageous Effects of Invention

According to the work vehicle having the above-described aspect, it is possible to improve maintainability.

BRIEF DESCRIPTION OF DRAWINGS

FIG. 12 is a plan view of a vehicle rear portion of a modification example of the wheel loader as the work vehicle according to the embodiment of the present invention, and a view showing a state where a movable fence is positioned at a retreat position and an opening and closing portion is at an open position.

DESCRIPTION OF EMBODIMENTS

First Embodiment

Hereinafter, an embodiment of a wheel loader as an example of a work vehicle according to the present invention will be described in detail with reference to FIGS. 1 to 11.

<Work Vehicle>

Figure 1:
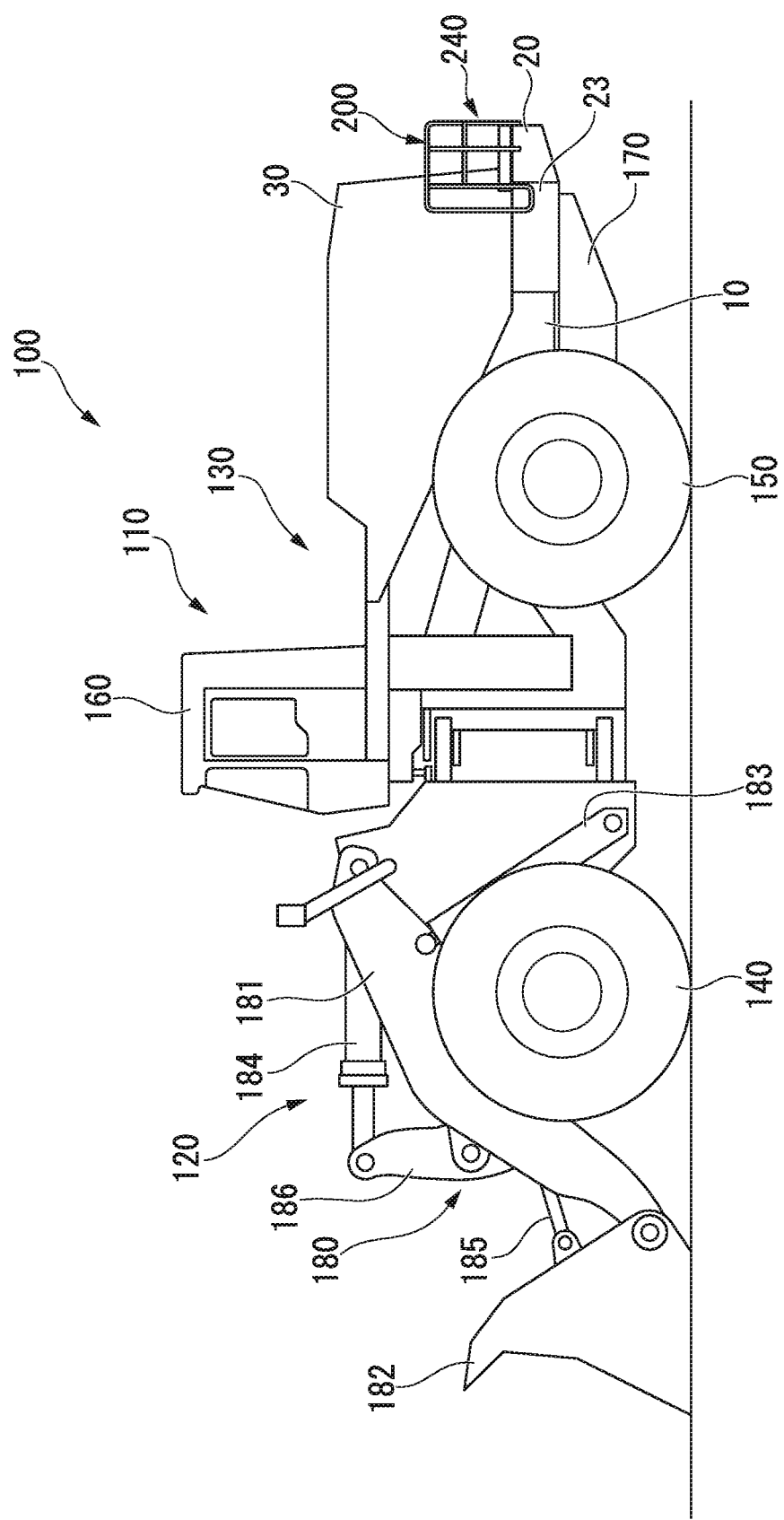
FIG. 1 is a side view of a wheel loader as a work vehicle according to an embodiment of the present invention.
Figure 2:
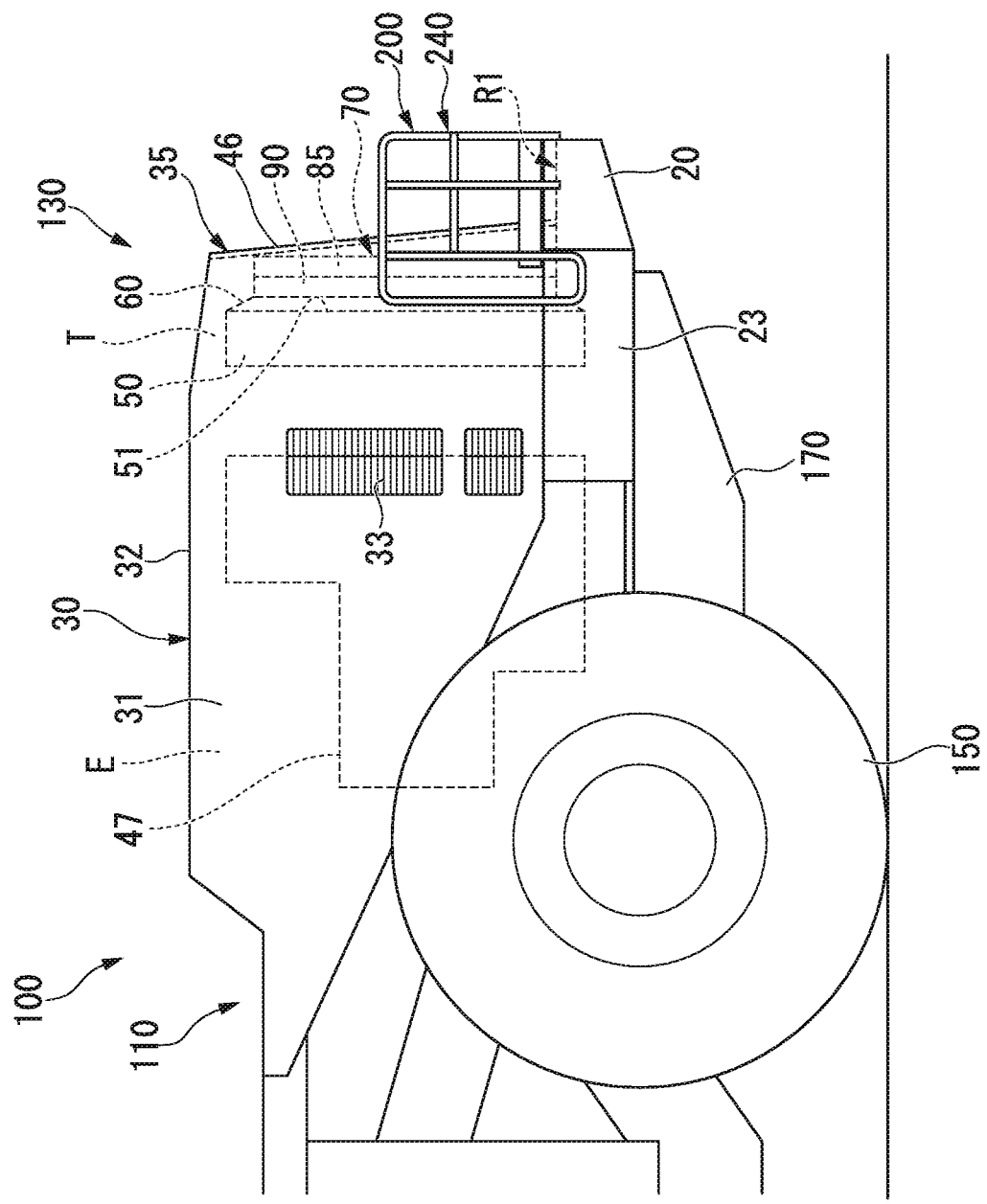
FIG. 2 is a side view of a vehicle rear portion of the wheel loader as the work vehicle according to the embodiment of the present invention.

As shown in FIGS. 1 and 2, a wheel loader 100 as a work vehicle includes a vehicle body 110, a work equipment 180, an engine 47, a cooling unit 50, a fixation shroud 60, a blower unit (opening and closing portion) 70, and a grille (opening and closing portion) 46.

Figure 3:
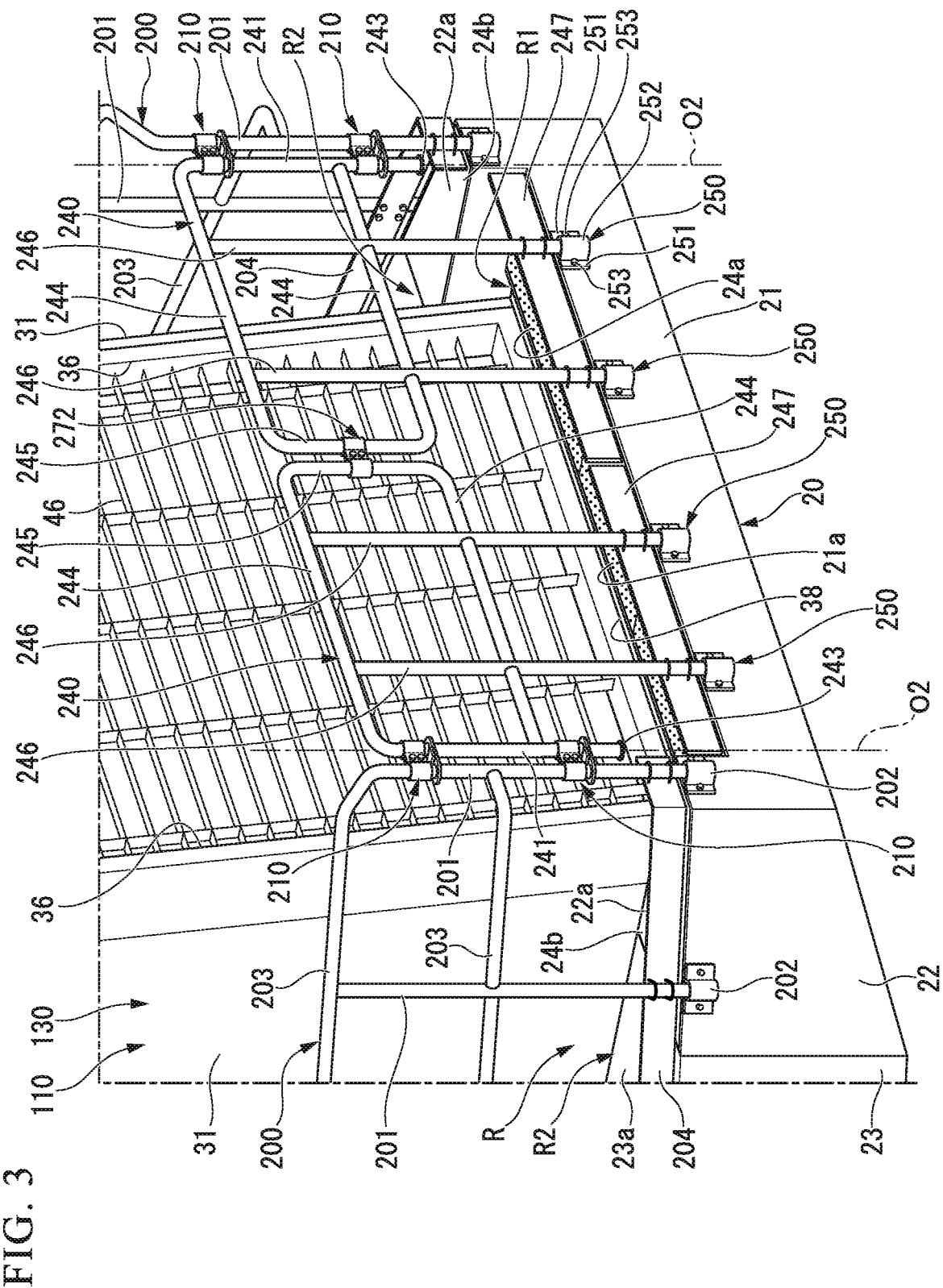
FIG. 3 is a perspective view of the vehicle rear portion of the wheel loader as the work vehicle according to the embodiment of the present invention and a view for explaining a state of a normal position of a movable fence.
Figure 4:
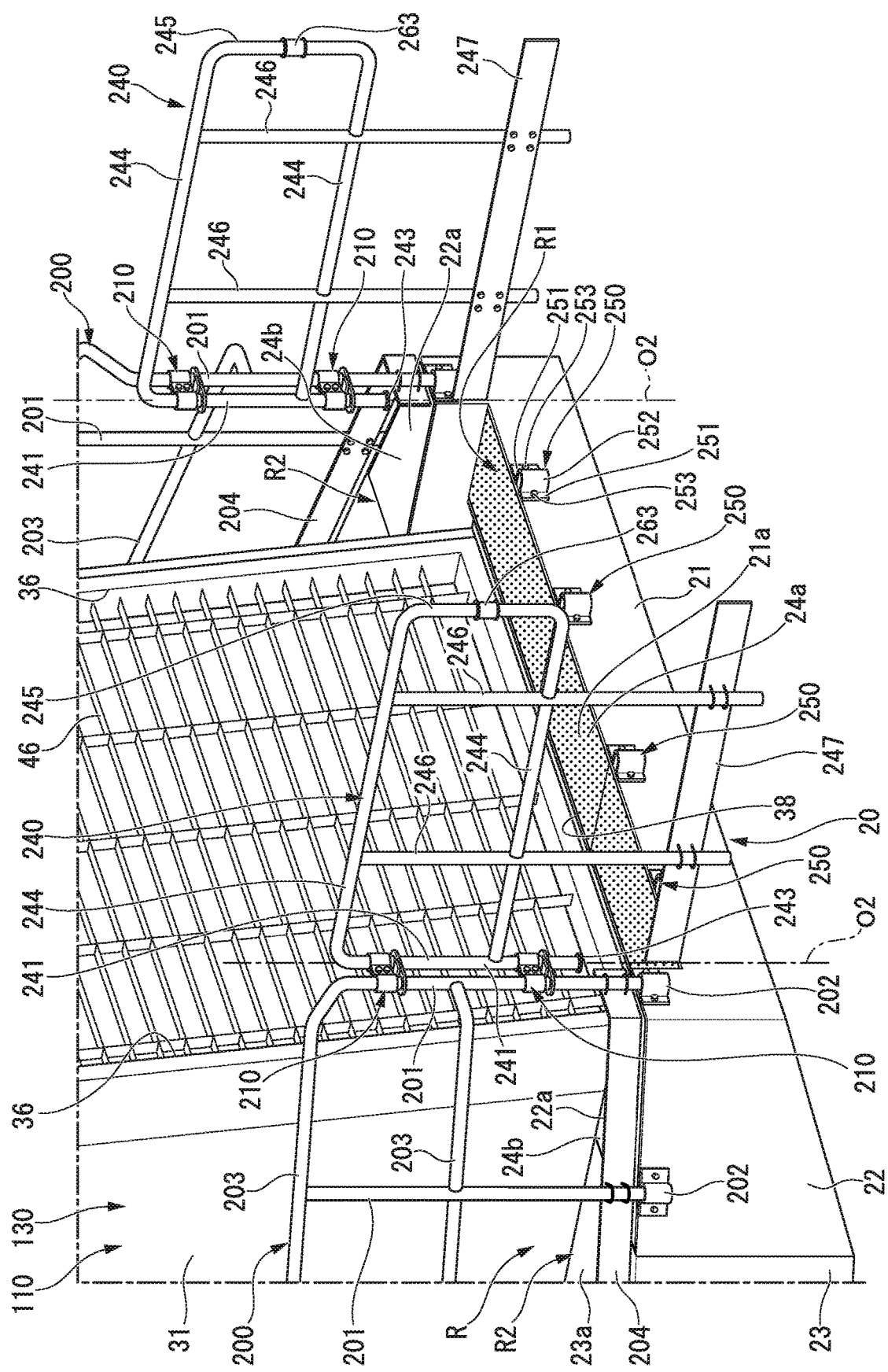
FIG. 4 is a perspective view of the vehicle rear portion of the wheel loader as the work vehicle according to the embodiment of the present invention and a view for explaining a state of a retreat position of the movable fence.
Figure 5:
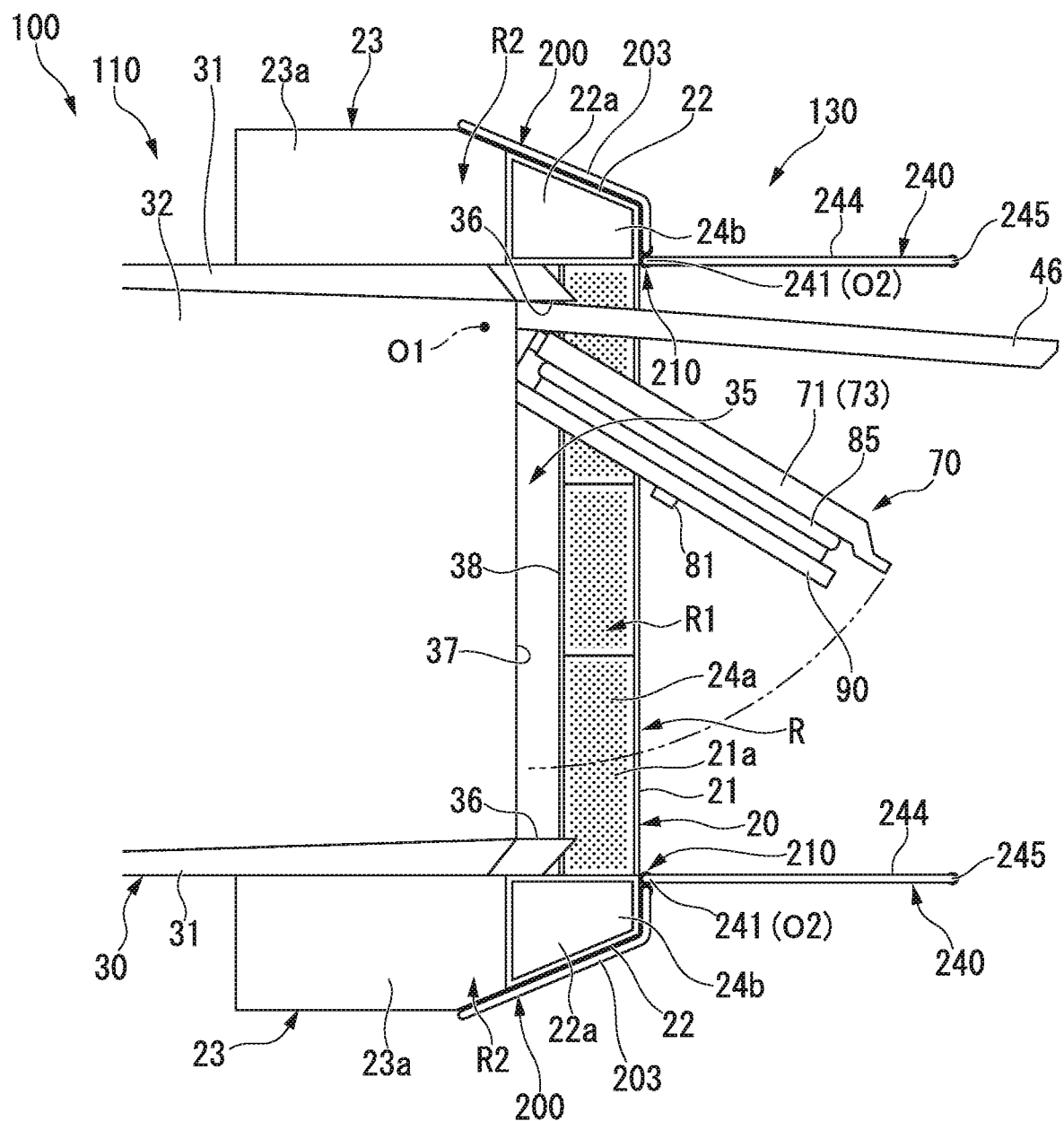
FIG. 5 is a plan view of the vehicle rear portion of the wheel loader as the work vehicle according to the embodiment of the present invention and a view showing a state where the movable fence is at the retreat position and an opening and closing portion is at an open position.

The wheel loader 100 includes movable fences 240, and as shown in FIGS. 3 to 5, includes rotation connection portions 210 and attachment/detachment fixing portions 250.

As shown in FIGS. 1 and 2, the vehicle body 110 includes a vehicle front portion 120, a vehicle rear portion 130, front wheels 140, rear wheels 150, a cab 160, and a fuel tank 170.

The vehicle front portion 120 configures a front portion of the vehicle body 110 and the vehicle rear portion 130 configures a rear portion of the vehicle body 110. The vehicle front portion 120 and the vehicle rear portion 130 are connected to be rotatable in a horizontal direction to each other.

The front wheels 140 are provided in the vehicle front portion 120 and the rear wheels 150 are provided in the vehicle rear portion 130. The vehicle body 110 moves forward and backward by driving the front wheels 140 and the rear wheels 150.

The cab 160 is provided to protrude upward on the portion on the front side of the vehicle rear portion 130. A driver seat is provided inside the cab 160.

The fuel tank 170 is provided below the vehicle rear portion 130, and a fuel is stored inside the fuel tank 170.

Hereinafter, a forward-backward direction, a front side, a rear side, and a width direction of the vehicle body 110 may be simply referred to as a "forward-backward direction", a "front side", a "rear side", and a "width direction", respectively. In addition, the width direction may be referred to as a "right side" or a "left side". In addition, a side toward the center in the width direction may be referred to as an "inside", and a side from the center in the width direction toward the right side or the left side may be referred to as an "outside".

The work equipment 180 is provided on a front side portion of the vehicle front portion 120 of the vehicle body 110. The work equipment 180 includes a boom 181 and a bucket 182. The boom 181 is connected to the vehicle body 110 to be rotatable. In addition, the bucket 182 is connected to one end of a bell crank 186 via a link 185. A bucket drive cylinder 184 is connected to the other end of the bell crank 186. The bucket 182 is connected to the tip of the boom 181 to be rotatable. The boom 181 is driven by a boom drive cylinder 183 and the bucket 182 is driven by the bucket drive cylinder 184. The boom drive cylinder 183 and the bucket drive cylinder 184 are driven by a hydraulic pressure supplied via a hydraulic circuit.

<Vehicle Rear Portion>

Hereinafter, a vehicle rear portion 130 will be described in more detail with reference to FIGS. 2 to 6.

The vehicle rear portion 130 includes a rear frame 10, a bumper 20, an exterior cover 30, a support frame 40, and fixed fences 200.

The rear frame 10 has a bar shape which extends in the forward-backward direction, and a pair of rear frames 10 is provided to be parallel to each other with an interval therebetween in the width direction.

<Bumper>

The bumper 20 is provided to extend in the width direction over the pair of rear frames 10 on the rear sides of the pair of rear frames 10. The bumper 20 may be directly fixed to the pair of rear frames 10, or may be fixed to the pair of rear frames 10 via another member such as an end plate provided over the pair of rear frames 10.

As shown in FIGS. 3 to 6, in the bumper 20, the center portion in the width direction becomes a bumper center portion 21, and both right and left portions of the bumper center portion 21 become bumper side portions 22.

The bumper center portion 21 extends over the gap between the pair of rear frames 10 in the width direction. More specifically, the bumper center portion 21 extends between an end portion on the outside in the width direction of one rear frame 10 and an end portion on the outside in the width direction of the other rear frame 10. An upper surface 21a of the bumper center portion 21 extends in the width direction so as to be parallel to a horizontal surface, and a portion on the upper surface 21a extends in the width direction and becomes a rear passage R1 through which a worker can pass. In the present embodiment, a nonslip mat 24a formed of a resin or the like is provided on the upper surface 21a of the bumper center portion 21, which becomes the rear passage R1, over the width direction of the vehicle body 110. The nonslip mat 24a may be a steel plate having an uneven surface.

The bumper side portions 22 are positioned further outside in the width direction than the outside of the rear frame 10 in the width direction and are provided on both end sides of the bumper center portion 21. An upper surface 22a of each of the bumper side portions 22 is parallel to the horizontal surface, and is disposed so as to be higher by one step than the bumper center portion 21. Accordingly, a step is formed between the upper surface 22a of the bumper side portion 22 and the upper surface 21a of the bumper center portion 21.

For example, an accommodation portion 23 in which a device such as a battery can be accommodated is provided on the front sides of the bumper side portions 22 and the outside of the rear frame 10 in the width direction. The rear side of the accommodation portion 23 is in contact with the bumper side portion 22 and the inside of the accommodation portion 23 in the width direction is in contact with the rear frame 10. The accommodation portion 23 may be directly fixed to the rear frame 10 and may be fixed to the rear frame 10 via the end plate.

An upper surface 23a of the accommodation portion 23 has the same height as that of the upper surface 22a of the bumper side portion 22 and the upper surface 23a extends in the forward-backward direction so as to be parallel to the horizontal surface. The portion on the upper surface 23a of the accommodation portion 23 and the portion on the upper surfaces 22a of the bumper side portions 22 become a side passage R2 which extends on the bumper side portions 22 and the accommodation portion 23 in the forward-backward direction. Similarly to the rear passage R1, a nonslip mat 24b is provided on the upper surfaces 22a of the bumper side portions 22 and the upper surface 23a of the accommodation portion 23 which become the side passage R2.

A passage R of the vehicle body 110 is configured of the rear passage R1 and the side passage R2.

<Exterior Cover>

As shown in FIGS. 2 to 6, the exterior cover 30 includes a pair of side covers 31 and a top cover 32.

The pair of side covers 31 has a panel shape which extends in a vertical direction and the forward-backward direction, and is provided with an interval therebetween in the width direction. Each of the lower ends of the pair of side covers 31 is fixed to each of the pair of corresponding rear frames 10 in the width direction.

The top cover 32 has a panel shape which extends in the forward-backward direction and the horizontal direction. Both ends of the top cover 32 in the width direction are connected to the upper ends of the pair of side covers 31 in the forward-backward direction.

An internal space is formed inside the exterior cover 30 by the exterior cover 30 including the pair of side covers 31 and the top cover 32. The front side portion of the internal space becomes an engine room E, and the rear side portion thereof becomes a heat exchange room T. A partition plate may be provided between the engine room E and the heat exchange room T such that air can flow through a portion between the engine room E and the heat exchange room T, or the engine room E and the heat exchange room T may communicate with each other without providing the partition plate. A ventilation portion 33 through which air can flow between the inside of the engine room E and the outside of the exterior cover 30 is formed at a location of the side cover 31 corresponding to the engine room E.

An opening portion 35 which penetrates the inside and the outside and exposes the heat exchange room T to the rear side is formed on the rear end of the exterior cover 30. The opening portion 35 has a rectangular shape in which the rear ends extending in the vertical direction in the side covers 31 become side edge portions 36, the rear end extending in the width direction in the top cover 32 becomes an upper edge portion 37, and the front end extending in the width direction on the upper surface 21a of the bumper center portion 21 becomes a lower edge portion 38. That is, the opening portion 35 is formed to be partitioned by the rear end of the exterior cover 30 and the front end of the bumper 20. The rear passage R1 is positioned to extend in the width direction along the lower edge portion 38 of the opening portion 35 on the rear side of the opening portion 35.

<Support Frame>

Figure 6:
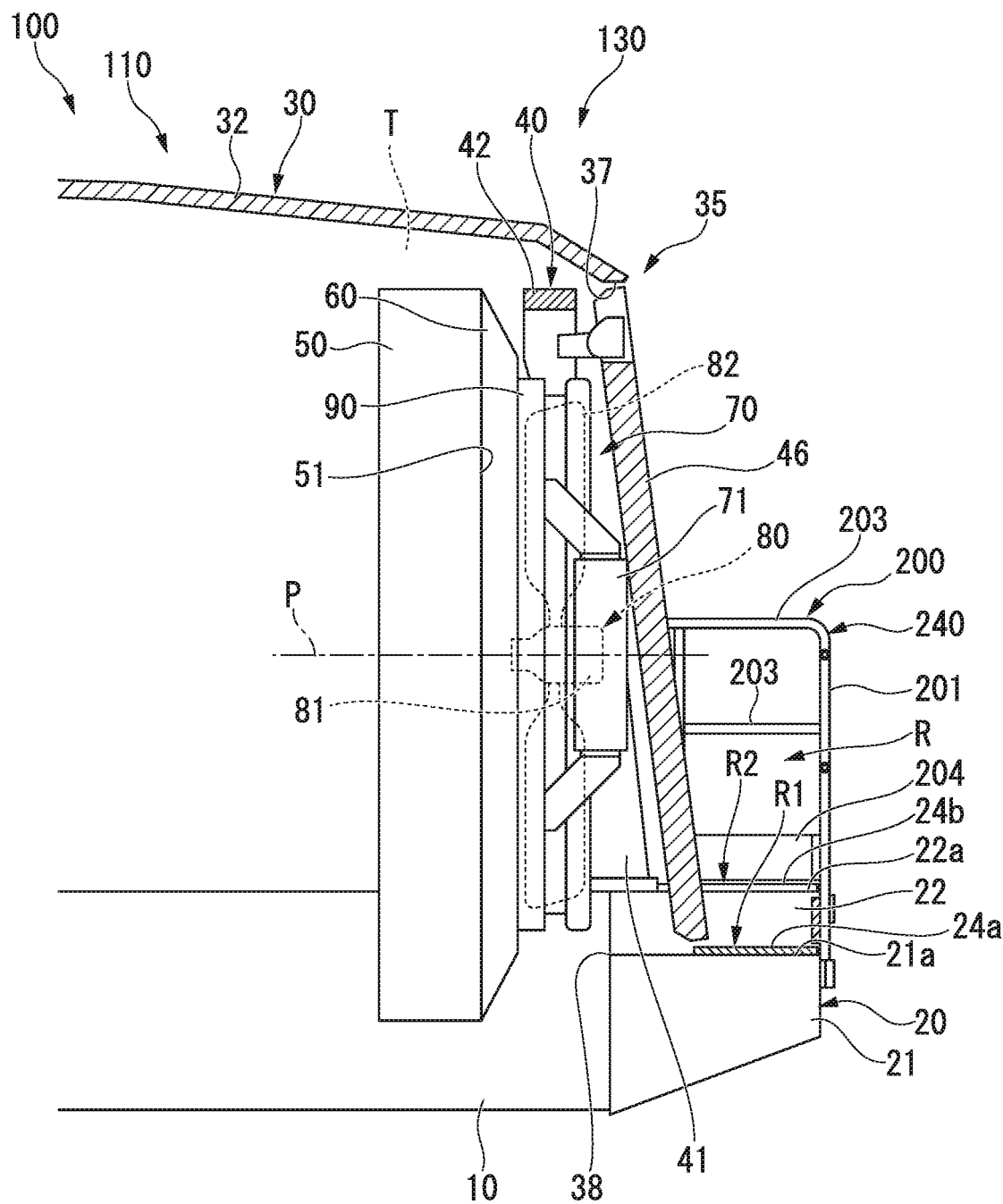
FIG. 6 is a side view of a cooling unit and a blower unit at a closed position in which the vehicle rear portion of the wheel loader as the work vehicle according to the embodiment of the present invention is shown in a vertical section.
Figure 7:
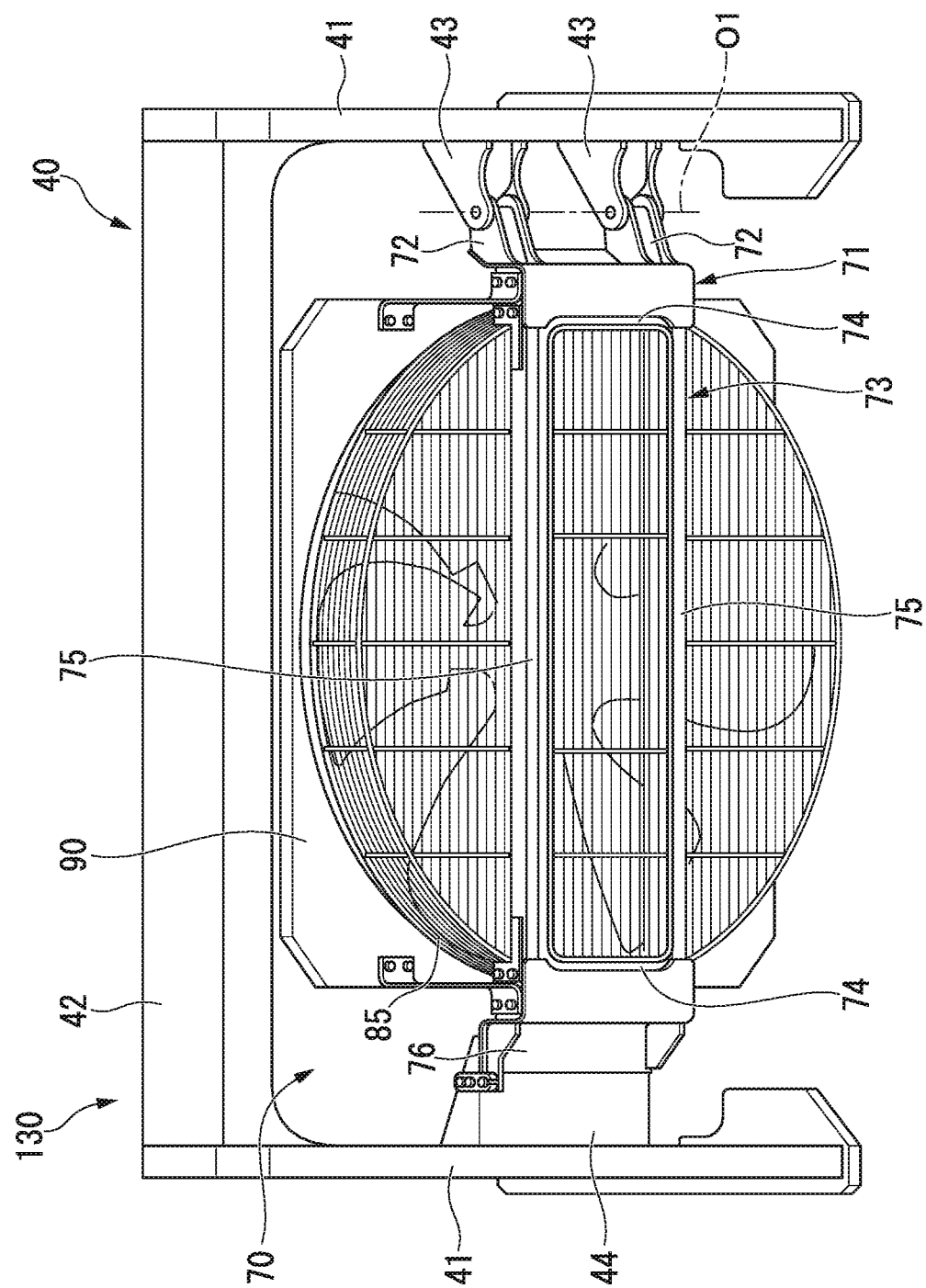
FIG. 7 is a perspective view when the blower unit of the wheel loader as the work vehicle according to the embodiment of the present invention and a support frame supporting the blower unit are viewed from the rear and from above.

As shown in FIGS. 6 and 7, the support frame 40 is a gate-shaped member provided at a position on the rear side of the heat exchange room T inside the exterior cover 30, that is, a position on the opening portion 35 side. The support frame 40 has a function of supporting the blower unit 70. As shown in FIG. 7, the support frame 40 includes a pair of side frames 41, an upper frame 42, rotating brackets 43, and a fixing bracket 44.

The pair of side frames 41 has a bar shape extending in the vertical direction and is provided with an interval therebetween in the width direction. The lower end of each of the pair of side frames 41 is fixed to the corresponding rear frame 10 in the width direction. The pair of side frames 41 is disposed along the inner surfaces of the corresponding side covers 31. The side cover 31 may be fixed to the outside of the side frame 41 in the width direction. The pair of side frames 41 is provided along the side edge portions 36 of the opening portion 35 to approach the side edge portions 36.

The upper frame 42 has a bar shape which extends over the pair of rear frames 10 in the width direction so as to connect the upper ends of the pair of rear frames 10 to each other. The top cover 32 of the exterior cover 30 may be fixed to the upper surface of the upper frame 42. The upper frame 42 is provided along the upper edge portion 37 of the opening portion 35 to approach the upper edge portion 37.

Each of the rotating brackets 43 has a function of rotatably supporting the blower unit 70. The rotating brackets 43 are integrally provided on one (the side frame 41 on the right side in the width direction) of the pair of side frames 41. The rotating brackets 43 are provided to protrude further inside in the width direction from the surface of the side frame 41 facing the inside in the width direction. A plurality of (two in the present embodiment) rotating brackets 43 are provided at intervals therebetween in the vertical direction, that is, the extension direction of the side frame 41. Hole portions which extend along an opening and closing axis O1 extending in the vertical direction are formed in the rotating brackets 43. Holes of the plurality of rotating brackets 43 are positioned on the same opening and closing axis O1.

Since the rotating brackets 43 are disposed on one side in the width direction in the heat exchange room T, the opening and closing axis O1 passing through the rotating bracket 43 is disposed on one side in the width direction in the heat exchange room T. The opening and closing axis O1 extends in the vertical direction along the side edge portion 36 on one side of the opening portion 35 in the width direction.

The fixing bracket 44 has a function of supporting the blower unit 70, which is detachably fixed to the fixing bracket 44, in a fixed state. The fixing bracket 44 is integrally provided on the other (the side frame 41 on the left side in the width direction) of the pair of side frames 41. The fixing bracket 44 is provided to protrude further inside from the surface of the side frame 41 facing the inside in the width direction.

<Fixed Fence>

Each of the fixed fences 200 can be reached by hands of a worker on the side passage R2. As shown in FIGS. 3 to 5, a pair of fixed fences 200 is provided on the right and left sides to correspond to the pair of right and left side passages R2. Each of the fixed fences 200 is provided along the outer edge of the side passage R2. That is, the fixed fence 200 is provided over the outsides of the upper surface 23a of the accommodation portion 23 and the upper surface 22a of the bumper side portion 22 in the width direction and the rear side of the upper surface 22a of the bumper side portion 22. The fixed fence 200 is provided to be erected upward from the accommodation portion 23 and the bumper side portion 22.

Each fixed fence 200 includes vertical bars 201, horizontal bars 203, and guards 204.

Each of the vertical bars 201 is a bar-shaped member which extends in the vertical direction. A plurality of vertical bars 201 are provided on the outer edges of the side passages R2 at intervals therebetween in the forward-backward direction. The lower portion of each vertical bar 201 is attached to the side surface of the accommodation portion 23 facing the outside in the width direction or the rear surface of the bumper side portion 22 via a fixing portion 202. The vertical bars 201 may be fixed to the surface of the bumper side portion 22 facing the outside in the width direction. The vertical bars 201 of the fixed fences 200 may be fixed to the vehicle body 110 by welding or the like.

The backmost vertical bar 201 among the plurality of vertical bars 201 is fixed at a position approaching the rear passage R1 in the side passage R2. In the present embodiment, the backmost vertical bar 201 is fixed to the rear surface of the bumper side portion 22. The backmost vertical bar 201 becomes a post for supporting movable fences 240 via rotation connection portions 210.

Each of the horizontal bars 203 is a bar-shaped member which extends in the horizontal direction along the outer edge of the side passage R2. A plurality of (two in the present embodiment) horizontal bars 203 are provided at intervals therebetween in the vertical direction and extend over the plurality of vertical bars 201. The uppermost horizontal bar 203 among the plurality of horizontal bars 203 is connected to the upper ends of the vertical bars 201. For example, the uppermost horizontal bar 203 is a handrail for a worker who passes through the side passage R2.

Each of the guards 204 has a plate-shaped member which extends in the horizontal direction along the outer edge of the side passage R2 and extends in the vertical direction. Each guard 204 extends over the plurality of vertical bars 201. For example, the guard 204 is fixed to the vertical bar 201 by welding or the like. The lower end of the guard 204 is disposed to be positioned at a height corresponding to the upper surface 23a of the accommodation portion 23 and the upper surface 21a of the bumper side portion 22 configuring the side passage R2.

<Engine>

As shown in FIG. 2, the engine 47 is provided in the engine room E, which is the front side portion of the internal space of the exterior cover 30. The engine 47 is driven by a fuel supplied from the fuel tank 170. A driving force of the engine 47 is transmitted to the front wheels 140 and the rear wheels 150 via a shaft. Accordingly, the wheel loader 100 moves forward and backward. The driving force of the engine 47 is transmitted to a hydraulic pump (not shown). A hydraulic oil pressurized by the hydraulic pump is supplied to hydraulically driven devices such as the boom drive cylinder 183 or the bucket drive cylinder 184 via a hydraulic circuit. The engine 47 has a water-cooled structure.

<Cooling Unit>

As shown in FIGS. 2 and 6, the cooling unit 50 is provided in the heat exchange room T inside the exterior cover 30. The cooling unit 50 is provided on the front side from the above-described opening portion 35 or support frame 40.

The cooling unit 50 includes cooling devices such as a radiator, an oil cooler, or an after-cooler, and an outer frame in which the cooling devices are accommodated. The outer frame has a rectangular parallelepiped shape in which the shape viewed from the front side and the rear side is a rectangular shape. A surface formed of a plurality of radiating tubes in the radiator is exposed from a rear surface 51 of the cooling unit 50 facing the rear side.

<Fixation Shroud>

As shown in FIGS. 2 and 6, the fixation shroud 60 is a member provided on the rear side of the cooling unit 50 in the heat exchange room T of the vehicle rear portion 130. The fixation shroud 60 is an annular member which surrounds a reference axis P which extends in the forward-backward direction. The reference axis P is an axis which extends in the forward-backward direction passing through the center of the rear surface 51 of the cooling unit 50. The fixation shroud 60 has a function of guiding air which flows inside from the front side of the cooling unit 50 and flows from the rear surface 51 of the cooling unit 50 to the rear side further backward. The diameter of the inner peripheral surface of the fixation shroud 60 decreases toward the rear side. Accordingly, in a flow path inside the fixation shroud 60, a cross-sectional area of the flow path orthogonal to the reference axis P decreases toward the rear side.

<Blower Unit>

As shown in FIGS. 2, and 5 to 7, the blower unit 70 is supported to be rotatable around the opening and closing axis O1 with respect to the vehicle rear portion 130 on the rear side of the fixation shroud 60. The blower unit 70 has a function of supplying air for cooling the cooling unit 50 to the cooling unit 50. The blower unit 70 is supported to be rotatable between a closed position at which the blower unit 70 faces the rear surface 51 of the cooling unit 50 from the rear side and an open position at which the blower unit 70 exposes the rear surface of the cooling unit.

The blower unit 70 includes a movable bracket 71, a fan 80, a guard portion 85, and a movable shroud 90.

<Movable Bracket>

As shown in FIG. 7, the movable bracket 71 is rotatably supported with respect to the vehicle rear portion 130 and has a function of supporting the fan 80, the movable shroud 90, and the guard portion 85. As shown in FIG. 7, the movable bracket 71 includes rotation support portions 72, a bracket body 73, and a fixing connection portion 76.

As shown in FIGS. 5 and 7, the rotation support portions 72 are connected to the rotating brackets 43 of the support frame 40 to be rotatable around the opening and closing axis O1. The movable bracket 71 has a pair of rotation support portions 72 corresponding to the pair of the rotating brackets 43. For example, each of the rotation support portions 72 is connected to each rotating bracket 43 to be rotatable via a pin inserted into a hole portion along the opening and closing axis O1 of the rotating bracket 43.

The rotation support portions 72 are integrally fixed to the one end of the bracket body 73. The bracket body 73 extends from the inside in a radial direction of a virtual circle having the opening and closing axis O1 as a center toward the outside in the radial direction, with one end fixed to the rotation support portions 72 as a base end.

As shown in FIGS. 6 and 7, a state where the bracket body 73 extends in the width direction is the closed position of the blower unit 70. As shown in FIG. 5, a state where the bracket body 73 rotates from the closed position toward the rear side of the vehicle rear portion 130 around the opening and closing axis O1 and the bracket body 73 diagonally extends to the rear side from the opening and closing axis O1 is the open position of the blower unit 70.

As shown in FIG. 7, the fixing connection portion 76 is provided on the other end of the bracket body 73. When the blower unit 70 is at the closed position, the fixing connection portion 76 is detachably fixed to the fixing bracket 44.

In addition, in the present embodiment, as shown in FIG. 7, when in the closed position, the bracket body 73 has a frame shape including a pair of vertical frame portions 74 disposed so as to be separated from each other on the right and left sides in the width direction and extends in the vertical direction and a pair of horizontal frame portions 75 which connects the pair of the vertical frame portions 74 to each other in the width direction and is disposed so as to be separated from each other in the up-and-down direction. The rotation support portions 72 are provided on one of the pair of vertical frame portions 74, and the fixing connection portion 76 is provided on the other.

<Fan>

As shown in FIG. 6, the fan 80 includes a hydraulic motor 81 and a fan body 82.

The hydraulic motor 81 is a motor rotationally driven by the hydraulic oil supplied via a hydraulic cable (not shown) from the hydraulic pump. The hydraulic motor 81 is fixed to a portion of the bracket body 73 of the movable bracket 71 between the pair of horizontal frame portions 75. The hydraulic motor 81 is fixed to the bracket body 73. The hydraulic motor 81 is disposed to protrude from the bracket body 73 toward the front side. The hydraulic motor 81 is configured such that a drive shaft rotates when the hydraulic oil is supplied to the hydraulic motor 81. In a case where the blower unit 70 is at closed position, an axis of the drive shaft of the hydraulic motor 81 coincides with the reference axis P.

The fan body 82 is rotationally driven by the hydraulic motor 81 to blow air. The fan body 82 has a plurality of blades which are provided at intervals therebetween in the circumferential direction of the drive shaft.

In a case where the blower unit 70 is at the closed position, the fan 80 of the blower unit 70 faces the rear surface 51 of the cooling unit 50 from the rear side. If the hydraulic motor 81 is driven in this state, the fan body 82 rotates, and a flow of air from the front side toward the rear side is generated.

<Guard Portion>

As shown in FIG. 5 or 7, the guard portion 85 is a member which covers the fan 80 from the rear side and the outside of the fan 80 in the radial direction. The guard portion 85 has a lattice shape including a plurality of bar-shaped members and is integrally fixed to the movable bracket 71. The guard portion 85 ensures safety when the fan 80 rotates while the obstruction in the flow of air is prevented.

<Movable Shroud>

As shown in FIGS. 5 to 7, the movable shroud 90 is integrally provided on the blower unit 70 along with the fan 80. The movable shroud 90 has a tubular shape which covers the fan body 82 of the fan 80 from the outer periphery side and has a function of introducing air to the fan body 82.

When the blower unit 70 is at the closed position, as shown in FIG. 6, the blower unit 70 faces the rear surface 51 of the cooling unit 50 from the rear side. At this case, since the movable shroud 90 is connected to the rear side of the fixation shroud 60, a flow path which continues from the rear surface 51 of the cooling unit 50 toward the rear side is formed inside the fixation shroud 60 and the movable shroud 90. In this way, in the present embodiment, the shroud through which air is introduced to the fan 80 is configured of a segmented structure including the fixation shroud 60 and the movable shroud 90.

When the blower unit 70 rotates from the closed position to the open position, the blower unit 70 does not interfere with the side edge portions 36, the upper edge portion 37, and the lower edge portion 38 of the opening portion 35 of the vehicle rear portion 130. That is, each size of the fan 80, the movable shroud 90, or the guard portion 85 configuring the blower unit 70 is set to be capable of passing through the opening portion 35.

<Grille>

As shown in FIG. 2 or 5 and 6, the grille 46 is provided so as to be rotatable to open and close the opening portion 35 of the vehicle rear portion 130 on the rear side of the blower unit 70. The grille 46 has a lattice shape including a plurality of bar-shaped members, and the outline of the grille 46 is formed in a rectangular shape corresponding to the shape when the opening portion 35 is viewed in the forward-backward direction. The grille 46 can rotate between a closed position which closes the opening portion 35 of the vehicle rear portion 130 and an open position which opens the opening portion.

The grille 46 is provided to be inclined frontwards toward the front side in a state where the grille 46 closes the opening portion 35. The grille 46 is supported to be rotatable around an opening and closing axis (not shown) which extends in the vertical direction and is inclined frontwards with respect to one (the side frame 41 on the right side in the width direction) of the pair of side frames 41. In the grille 46, the opening and closing axis of the grille 46 may be the same as the opening and closing axis O1 of the blower unit 70 or may be different from the opening and closing axis O1.

In the present embodiment, an opening and closing portion of the wheel loader 100 is configured by the grille 46, and the blower unit 70 between the grille 46 and the cooling unit 50.

<Rotation Connection Portion>

Next, the rotation connection portions 210, the movable fences 240, and the attachment/detachment fixing portions 250 will be described.

Figure 8:
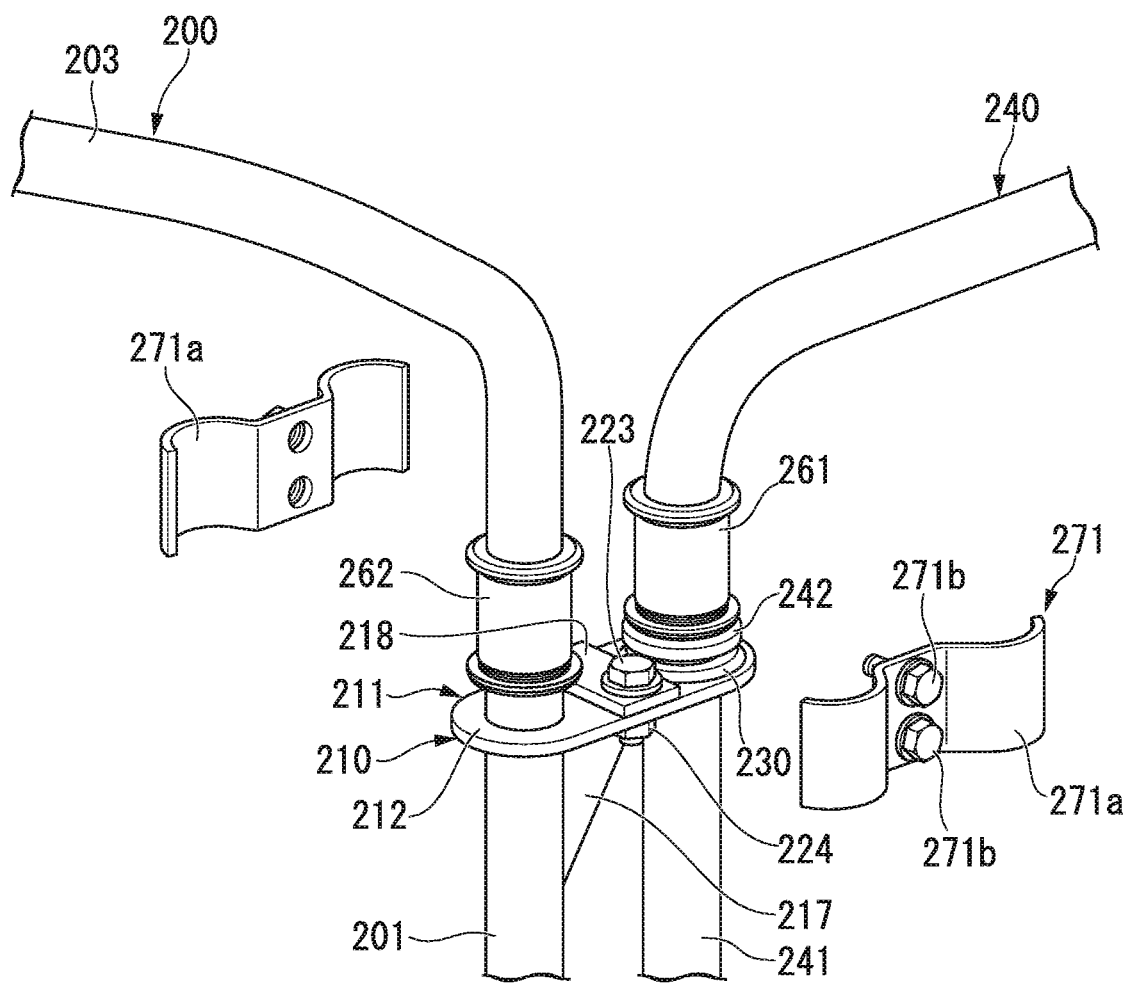
FIG. 8 is an exploded perspective view of a rotation connection portion of the wheel loader as the work vehicle according to the embodiment of the present invention.

As shown in FIGS. 3, 4, and 8, each of the rotation connection portions 210 has a function of connecting each movable fence 240 to the vehicle rear portion 130 to be rotatable. The vehicle rear portion 130 rotatably supports the movable fences 240 via the rotation connection portions 210. The plurality of (two in the present embodiment) rotation connection portions 210 are fixed to the vertical bar 201 as posts of the pair of fixed fences 200 at intervals therebetween in the vertical direction.

Figure 9:
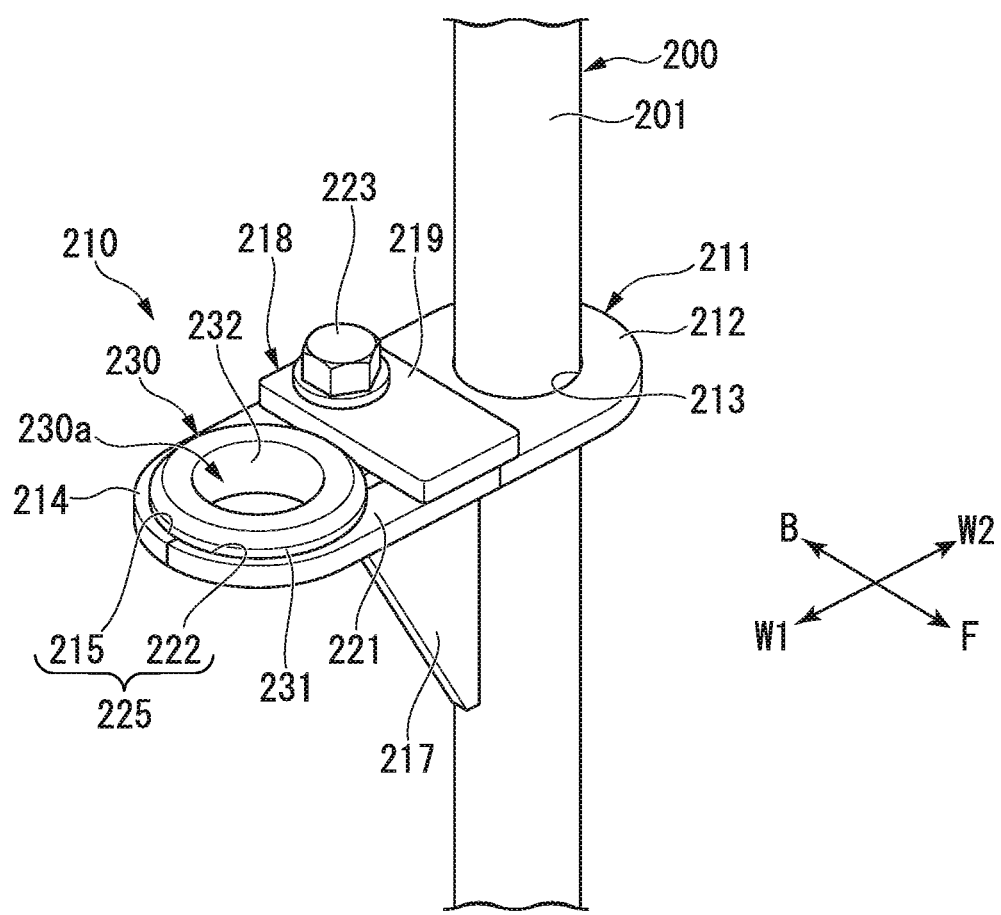
FIG. 9 is a partially enlarged view of the rotation connection portion of the wheel loader as the work vehicle according to the embodiment of the present invention.

As shown in FIGS. 8 and 9, each of the rotation connection portions 210 includes a support metal fitting 211 and a rubber bush 230.

Figure 10:
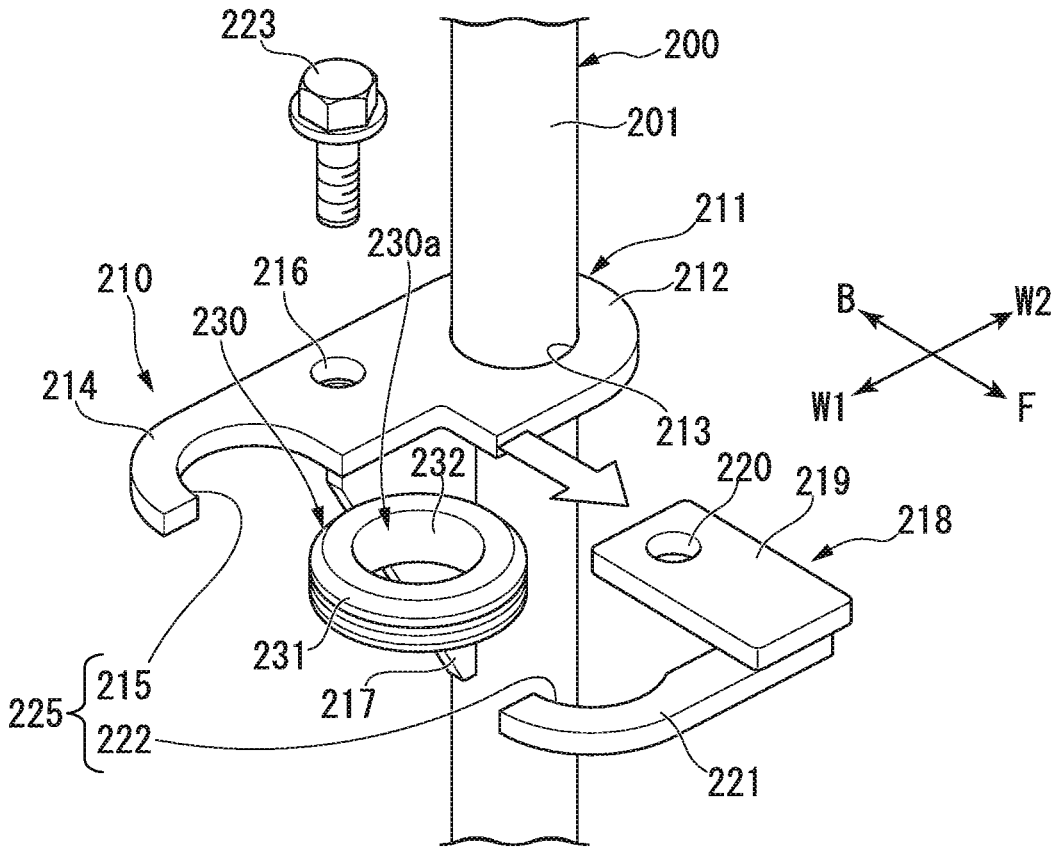
FIG. 10 is an exploded perspective view of the rotation connection portion shown in FIG. 8.

As shown in FIGS. 9 and 10, the support metal fitting 211 includes a metal fitting body 212, a reinforcement portion 217, a split piece 218, a bolt 223, and a nut 224 (refer to FIG. 8).

The metal fitting body 212 has a plate shape which extends along the horizontal surface, and has a through-hole 213 through which the vertical bar 201 serving as a post in the fixed fence 200 penetrates in the vertical direction. The metal fitting body 212 and the vertical bar 201 may be fixed to each other by welding or the like around the through-hole 213. The metal fitting body 212 extends to protrude toward the inside W1 in the width direction with the side on which the through-hole 213 is formed as a base end side.

A first hook-shaped portion 214 which extends toward the rear side B is formed on a side opposite to base end side of the metal fitting body 212 on the outside W2 in the width direction and on the tip side on the inside W1 in the width direction. A first arc portion 215 recessed in a semicircular shape in a plan view toward the rear side B is formed on the surface of the first hook-shaped portion 214 facing the front side F. A bolt insertion hole 216 which penetrates the metal fitting body 212 in the vertical direction is formed in a portion of the metal fitting body 212 between the first arc portion 215 and the through-hole 213.

The reinforcement portion 217 is provided between the lower surface of the metal fitting body 212 and a portion of the vertical bar 201 of the fixed fence 200 facing the inside W1 in the width direction. The reinforcement portion 217 has a plate shape which extends along a vertical surface and is fixed to both the metal fitting body 212 and the vertical bar 201 of the fixing portion 202 by welding or the like.

The split piece 218 includes an abutment plate portion 219 which abuts on the portion of the metal fitting body 212, in which the bolt insertion hole 216 is formed, from above. The abutment plate portion 219 has a plate shape which extends along the horizontal surface. The abutment plate portion 219 has a bolt through-hole 220 which penetrates in the vertical direction so as to communicate with the bolt insertion hole 216. The abutment plate portion 219 extends toward the front side F from the bolt through-hole 220.

A second hook-shaped portion 221 which extends toward the inside W1 in the width direction is formed on the end portion on the front side F of the abutment plate portion 219. A second arc portion 222 recessed in a semicircular shape in a plan view toward the front side F is formed on the surface of the second hook-shaped portion 221 facing the rear side B.

The bolt 223 is inserted into the bolt insertion hole 216 and the bolt through-hole 220 from above in a state where the abutment plate portion 219 of the split piece 218 is placed on the metal fitting body 212. The nut 224 is fastened to the bolt 223 on the lower surface side of the split piece 218. The metal fitting body 212 and the split piece 218 are integrally fixed to each other by the bolt 223. A bush-holding portion 225 which is circular is formed by the first arc portion 215 of the metal fitting body 212 and the second arc portion 222 of the split piece 218.

As shown in FIGS. 9 and 10, the rubber bush 230 is an annular member formed of rubber. That is, a hole portion 230a which penetrates along a rotation axis O2 is formed in the rubber bush 230. The outer peripheral surface of the rubber bush 230 becomes a held surface 231 in which the entire periphery is held by the bush-holding portion 225 of the metal fitting body 212. When the metal fitting body 212 and the split piece 218 are assembled by the bolt 223 as described above, the rubber bush 230 is incorporated into the bush-holding portion 225.

The inner peripheral surface of the hole portion 230a of the rubber bush 230 becomes a bearing surface 232 for rotatably holding a base end shaft 241 (described later) of the movable fence 240. That is, the base end shaft 241 is disposed to penetrate the hole portion 230a of the rubber bush 230. The center axis of the inner peripheral surface of the rubber bush 230 becomes the rotation axis O2 which extends in the vertical direction. In addition, a resin bush or a metal bush may be used instead of the rubber bush 230.

In order to achieve the above-described configuration of the pair of rotation connection portions 210, as shown in FIGS. 3 to 5, a pair of right and left rotation axes O2 is disposed on the locations which becomes the end portion on the outside of the rear passage R1 in the width direction and the end portion of the rear side thereof. The pair of rotation axes O2 is disposed further outside and backward in the width direction than the rotation axis O1 of the blower unit 70 or the opening and closing axis of the grille 46.

<Movable Fence>

Each of the movable fences 240 can be, for example, reached by hands of a worker on the rear passage R1 at a normal position described later. The portion on the base end side of each of the pair of movable fences 240 is provided to be rotatable with respect to the fixed fence 200 by the rotation connection portions 210. The pair of movable fences 240 rotates between the normal position at which the movable fences 240 extend along the rear edge which becomes outer edge of the rear passage R1 and a retreat position at which the movable fences 240 rotate from the normal position to the rear side and extend to the rear side. The movable fences 240 positioned at the normal position extend to be erected upward from the rear edge of the rear passage R1, that is, the rear edge of the bumper center portion 21.

Each of the movable fences 240 includes a base end shaft 241, horizontal bars 244, a tip shaft 245, vertical bars 246, and a guard 247.

The base end shaft 241 is a bar-shaped member which extends in the vertical direction. The base end shaft 241 is provided to penetrate the bearing surfaces 232 of the rubber bushes 230 in the rotation connection portions 210 in the vertical direction. The base end shaft 241 penetrates the hole portions 230a of the rubber bushes 230 in the pair of upper and lower rotation connection portions 210. The base end shaft 241 can rotate around the rotation axis O2 while the outer peripheral surface of the base end shaft 241 slides on the bearing surfaces 232 of the rubber bushes 230. The base end shaft 241 can move in the vertical direction relative to the bearing surfaces 232.

As shown in FIG. 8, a flange 242 which extends from the outer peripheral surface of the base end shaft 241 is formed on a portion of the base end shaft 241 above each rubber bush 230. The flange 242 has an annular shape which has the rotation axis O2 as a center. The lower surface of the flange 242 abuts on the upper surface of the rubber bush 230. A load of the movable fence 240 is applied to the rubber bushes 230 via the flanges 242.

As shown in FIGS. 3 and 4, a flange portion 243 which extends from the lower end of the base end shaft 241 to the outer peripheral side is formed on the lower end of the base end shaft 241. When the base end shaft 241 moves upward by a predetermined amount, the flange portion 243 abuts on the lower surfaces of the support metal fittings 211 of the rotation connection portions 210. Accordingly, the movement of the base end shaft 241 in the vertical direction is limited.

As shown in FIG. 8, a sleeve 261 having a tubular shape, through which the base end shaft 241 penetrates, is provided on the portion of the base end shaft 241 above the flange 242. A sleeve 262 having a tubular shape through which the vertical bar 246 penetrates is also provided on the vertical bar 246 of the fixed fence 200. The sleeves 261 and 262 are configured such that the relative positions can be fixed to each other by a connection member 271 including a pair of connection pieces 271a and can be attached and detached by bolts 271b.

As shown in FIGS. 3 to 5, each of the horizontal bars 244 is a bar-shaped member in which one end is fixed to the base end shaft 241 and which extends to the outside in the radial direction of a virtual circle having the rotation axis O2 as a center. A plurality of (two in the present embodiment) horizontal bars 244 are provided to be parallel to each other at intervals therebetween in the vertical direction. The uppermost horizontal bar 244 among the plurality of horizontal bars 244 extends to the outside in the radial direction of the virtual circle having the rotation axis O2 as a center so as to be continuous from the upper end of the base end shaft 241. For example, the uppermost horizontal bar 244 becomes a handrail for a worker who passes the rear passage R1.

The tip shaft 245 is a bar-shaped member which extends in the vertical direction. The tip shaft 245 is fixed to the other ends of the plurality of horizontal bars 244 become the tips thereof. The tip shaft 245 is supported by the plurality of horizontal bars 244. The upper end of the tip shaft 245 is connected to be continued to the uppermost horizontal bar 244. The lower end of the tip shaft 245 is connected to be continued to the lowermost horizontal bar 244.

Each of the vertical bars 246 is a member which extends in the vertical direction. A plurality of (two in the present embodiment) vertical bars 246 are provided at intervals therebetween in the radial direction of a virtual circle having the rotation axis O2 as a center between the base end shaft 241 and the tip shaft 245. The upper end of each vertical bar 246 is fixed to the uppermost horizontal bar 244 and the vertical bar 246 is fixed to another horizontal bar 244 at an intermediate position from the upper end to the lower end. The lower end of each vertical bar 246 is positioned to be lower than the lower ends of the base end shaft 241 and the tip shaft 245. The lower end of each vertical bar 246 is positioned to be lower than the rear passage R1 which becomes the upper surface 21a of the bumper center portion 21.

Each of the guards 247 is a plate-shaped member which extends in the radial direction and the vertical direction of a virtual circle having the rotation axis O2 as a center. The guard 247 extends over the gap between the base end shaft 241 and the tip shaft 245 and is fixed to the plurality of vertical bars 246 by welding or the like, for example. The lower end of the guard 247 has a height corresponding to the upper surface 21a of the bumper center portion 21 which configures the rear passage R1. Accordingly, the lower end of each vertical bar 246 is positioned to be lower than the lower end of the guard 247.

Figure 11:
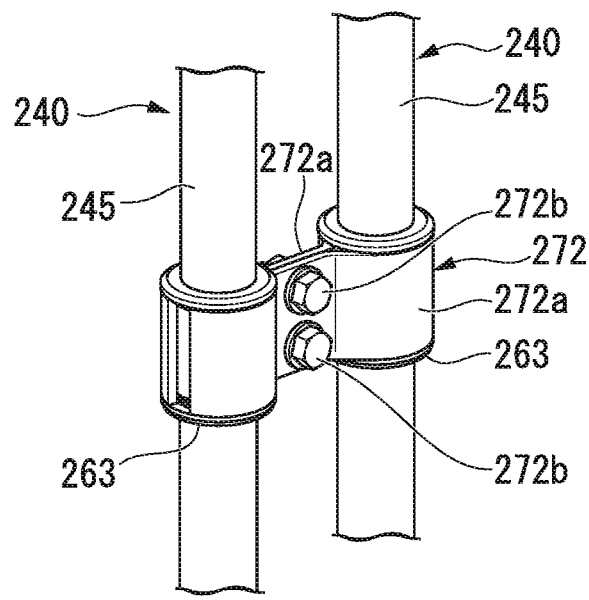
FIG. 11 is a partially enlarged view of the movable fence of the wheel loader as the work vehicle according to the embodiment of the present invention.

Here, as shown in FIG. 3, a state where the horizontal bars 244 of the movable fence 240 extends from the rotation axis O2 toward the inside in the width direction becomes the normal position of the movable fence 240. When the movable fence 240 is positioned at the normal position, the guard 247 is disposed along the rear edge of the rear passage R1, and the vertical bars 246 face the rear surface of the bumper center portion 21. In addition, when the movable fence 240 is positioned at the normal position, the tip shafts 245 of the pair of movable fences 240 are arranged at the center in the width direction, that is, the tips of the pair of movable fences 240 face each other in the width direction. As shown in FIG. 4 or 11, a sleeve 263 having a tubular shape is externally fitted to each of the pair of tip shafts 245. When the pair of movable fences 240 is positioned at the normal position, the pair of sleeves 263 is configured such that the relative positions of the sleeves 263 can be fixed to each other by a connection member 272 including a pair of connection pieces 272a and can be attached and detached by bolts 272b. As a result, the pair of movable fences 240 is connected to each other by the connection member 272.

The movable fence 240 at the normal position is positioned within an operation region including rotation loci of the blower unit 70 and the grille 46, that is, is positioned within operation ranges of the blower unit 70 and the grille 46. The sizes in the width direction of the pair of movable fences 240 are the same as each other when the pair of movable fences 240 is positioned at the normal position. In the present embodiment, the pair of movable fences 240 is symmetrical when the center in the width direction of the vehicle body 110 is set to a symmetrical surface.

As shown in FIGS. 4 and 5, a state where the horizontal bars 244 of the movable fence 240 extend from the rotation axis O2 toward the rear side is the retreat position of the movable fence 240. In the present embodiment, the movable fence 240 at the retreat position rotates 90° from the normal position and extends to be perpendicular with respect to the width direction. The movable fence 240 at the retreat position is positioned at a location deviated from the operation regions of the blower unit 70 and the grille 46, that is, is positioned outside the operation ranges of the blower unit 70 and the grille 46.

<Attachment/Detachment Fixing Portion>

As shown in FIGS. 3 and 4, a plurality of attachment/detachment fixing portions 250 are provided at intervals therebetween in the width direction on the rear surface of the bumper 20 becoming the rear surface of the vehicle rear portion 130. The number of the attachment/detachment fixing portions 250 is the same as the total number of the vertical bars 246 of the pair of movable fences 240. That is, the plurality of attachment/detachment fixing portions 250 are provided to correspond to the plurality of vertical bars 246.

Each of the attachment/detachment fixing portions 250 includes a pair of fixing plates 251, a curved plate 252, and a pair of fixing bolts 253. In addition, the pair of fixing plates 251 and the curved plate 252 are integrally configured so as to be one component and can be configured of a steel plate. For example, as the pair of fixing plates 251 and the curved plate 252, a component can be used in which one steel plate is pressed to form the curved plate 252, and thereafter, drilling for inserting the fixing bolts 253 is performed.

The pair of fixing plate 251 is a member having a plate shape which abuts on the rear surface of the bumper 20 on both sides in the width direction with respect to the vertical bar 246 in the case where the movable fence 240 is positioned at the normal position. The curved plate 252 is a member curved toward the rear side, and both end portions of the curved plate 252 in the width direction are respectively connected to the pair of fixing plates 251. The curved surface portion of the curved plate 252 is semicircular, and a radius of the semicircle is larger than a radius of a circle in a cross section of the vertical bar 246 of the movable fence 240. In addition, the cross section of the vertical bar 246 is not a circle, and may be rectangular such as a quadrangle or the like. In this case, the shape of the curved plate 252 may be larger than the shape of the cross section of the vertical bar 246. The pair of fixing plates 251 is detachably fixed to the rear surface of the bumper 20 by the fixing bolts 253.

In the case where the movable fence 240 is positioned at the normal position, each vertical bar 246 of the movable fence 240 is inserted into a space formed between the curved plate 252 and the rear surface of the bumper 20. In addition, since the pair of fixing plates 251 is fixed to the rear surface of the bumper 20 by the fixing bolts 253, each vertical bar 246 is restrained from the rear side by each curved plate 252. That is, the curved plate 252 is an accommodation portion which accommodates and fixes the vertical bar 246 so as to surround the outer surface of at least a portion of the vertical bar 246 of the movable fence 240 when the movable fence is positioned at the normal position. Accordingly, each vertical bar 246 of the movable fence 240 is held with respect to the vehicle rear portion 130.

<Operation and Effect>

When the wheel loader 100 is operated, as shown in FIG. 6, the blower unit 70 and the grille 46 are at the closed positions. As shown in FIG. 3, the movable fences 240 are positioned at the normal positions and are fixed to the rear surface of the bumper 20 by the attachment/detachment fixing portions 250, and the pair of movable fences 240 is connected to each other by the connection member 272.

When the fan body 82 of the blower unit 70 rotates, ventilation is performed from the inside of the heat exchange room T formed by the exterior cover 30 toward the rear side via the opening portion 35. Accordingly, air which flows into the engine room E and the heat exchange room T via the ventilation portion 33 of the exterior cover 30 flows toward the rear side so as to pass through the cooling unit 50 inside the heat exchange room T. The air in which the temperature increases by cooling the cooling unit 50 flows through the flow path, which is formed by the fixation shroud 60 and the movable shroud 90, toward the rear side via the fan 80. Thereafter, the air is discharged from the opening portion 35 of the vehicle rear portion 130 via the grille 46.

Here, since the wheel loader 100 loads earth and sand, crushed stones, or the like to transport these, if the wheel loader 100 is used in the work, the wheel loader 100 is exposed to an environment where there are clouds of dust. Accordingly, the dust is attached to the blower unit 70 or the cooling unit 50. Therefore, cleaning is performed as part of a maintenance work with respect to the blower unit 70 and the cooling unit 50.

When the maintenance work is performed, the connection state between the pair of the movable fences 240 realized by the connection member 272 is released, and the fixed state of each movable fence 240 with respect to the rear surface of the bumper 20 realized by the attachment/detachment fixing portions 250 is released. Each fixing plate 251 can be separated from the rear surface of the bumper 20 by loosening the fixing bolts 253 of each attachment/detachment fixing portion 250. Accordingly, the restriction state of each vertical bar 246 of the movable fence 240 due to each attachment/detachment fixing portion 250 is released, the vertical bar 246 can move upward. The worker may perform the release with respect to the fixed state of the movable fence 240 performed by the attachment/detachment fixing portions 250 from the ground.

Subsequently, a worker lifts the movable fence 240 upward from the rear passage R1, and the vertical bars 246 are pulled out from the attachment/detachment fixing portions 250. In addition, the worker returns the movable fence 240 to the original position such that the vertical bars 246 are positioned outside the attachment/detachment fixing portions 250. In this case, since the flange 242 of the base end shaft 241 of the movable fence 240 is placed on the rubber bush 230 of the rotation connection portion 210 from above, impact is relaxed by cushioning effects of the rubber bush 230. Accordingly, the movable fence 240 can rotate.

Thereafter, the worker rotates the movable fence 240 toward the rear side on the rear passage R1 or from the ground. Accordingly, as shown in FIGS. 4 and 5, the movable fences 240 are positioned at the retreat positions. Moreover, the operation regions of the movable fences 240 overlap the rear passage R1 in a plan view when viewed from above.

Continuously, each of the grille 46 and the blower unit 70 rotates from the closed position to the open position. In this case, since the retreat position of the movable fence 240 is deviated from the operation ranges of the grille 46 and the blower unit 70, the grille 46 and the blower unit 70 do not abut on the movable fences 240. In addition, similarly to the operation regions of the movable fences 240, the operation regions of the grille 46 and the blower unit 70 overlap the rear passage R1 in a plan view.

In this way, since the blower unit 70 and the grille 46 rotate to the open positions, the worker can perform maintenance with respect to the blower unit 70, the fixation shroud 60, and the rear surface 51 of the cooling unit 50 from the rear passage R1.

When the maintenance work ends, the worker rotates the blower unit 70 and the grille 46 from the open positions to the closed positions. Thereafter, the worker moves the movable fences 240 from the retreat positions to the normal positions, fixes the vertical bars 246 to the rear surface of the bumper 20 by the attachment/detachment fixing portions 250, and connects the pair of movable fences 240 to each other by the connection member 272. Accordingly, the wheel loader 100 can be restarted.

As described above, according to the present embodiment, since the movable fence 240 rotates from the normal positions to the retreat positions, it is possible to widen a range in which the grille 46 or the blower unit 70 can rotate without interfering with the movable fence 240. Since the movable fences 240 configured of a pair of doors rotate from the normal positions to the retreat positions, it is possible to further widen the rotation range of the grille 46 or the blower unit 70.

Particularly, for example, compared to a case where one movable fence 240 is disposed over the rear passage R1, in the present embodiment, since the pair of movable fences 240 is provided, the rotation range of each movable fence 240 decreases. Accordingly, it is possible to easily secure a space when the maintenance work is performed.

Here, for example, if the size of the rear passage R1 toward the rear side increases so as to increase a passage width, it is possible to secure the rotation range of the grille 46 or the blower unit 70. However, in this case, the size of the vehicle rear portion 130 inadvertently increases, and there is a disadvantage that the wheel loader 100 easily interferes with an obstacle when the wheel loader 100 is turned.

With respect to this, in the present embodiment, since the movable fence 240 at the normal position is positioned within the operation range of the grille 46 or the blower unit 70, the passage width of the rear passage R1 can be an appropriate size, and it is possible to prevent the size of the rear portion of the wheel loader 100 from increasing.

When the maintenance work is performed, it is possible to increase the range in which the grille 46 or the blower unit 70 can rotate without interfering with the movable fences 240 by positioning the movable fences 240 at the retreat positions. Accordingly, it is possible to easily perform work with respect to the blower unit 70, the fixation shroud 60, or the rear surface 51 of the cooling unit 50 from the rear passage R1 by taking advantages of the opening/closing type blower unit 70 to the utmost. When the maintenance work is performed, since the movable fences 240 are positioned at the retreat position at which the movable fences 240 extend from the rear passage R1 to the rear side, the movable fences 240 do not become an obstacle to the worker.

When the maintenance work is performed, it is considered that the fence itself on the rear passage R1 is removed. In this case, since the fence itself is heavy in a large-sized wheel loader 100, it is necessary to use a crane or the like, and the work is complicated. Moreover, in a case where the fence is removed, when the installation location of the fence is not determined, the fence becomes an obstacle of a worker who performs other work on the ground.

In the present embodiment, it is possible to easily move the movable fences 240 to the retreat positions without interfering with the blower unit 70 or the grille 46 and using a crane or the like when the maintenance work is performed while securing accessibility of a worker in the rear passage R1 due to the movable fences 240 which can be rotated. In addition, since the movable fences 240 at the retreat positions are maintained in the state of being supported to the vehicle rear portion 130, there is no problem with the installation location. Moreover, since the retreat positions of the movable fences 240 are predetermined, the movable fences 240 do not inadvertently interfere with the work performed by other workers on the ground or the operation of the work vehicle.

In the present embodiment, since the flange 242 of each movable fence 240 abuts on the rubber bush 230 of the rotation connection portion 210 from above, a friction force is generated between the flange 242 and the rubber bush 230. Accordingly, it is possible to prevent the movable fences 240 from inadvertently rotating. Therefore, for example, in the case where the movable fences 240 are positioned at the retreat positions, even when strong wind blows or the worker comes into unintentional contact with the movable fences 240, the movable fences 240 are not inadvertently rotated. Accordingly, it is possible to improve workability.

Moreover, when the vertical bars 246 are detached from the attachment/detachment fixing portions 250 by lifting each movable fence 240, and thereafter, the movable fence 240 is returned to the original height, since the rubber bush 230 becomes a cushion, it is possible to prevent large impact from being applied to the movable fences 240 or the rotation connection portions 210.

In addition, in the present embodiment, accessibility of a worker is secured by the fixed fence 200 in the side passage R2. That is, the portion which interferes with the grille 46 or the blower unit 70 is only the movable fences 240, and other portions become the fixed fence 200. Accordingly, it is possible to secure maintainability and accessibility while preventing complication of the configuration of the wheel loader 100.

Moreover, since the movable fence 240 can be detachably fixed to the rear surface of the bumper 20 by the attachment/detachment fixing portions 250, it is possible to prevent the movable fence 240 at the normal position from being inadvertently rotated. Since the attachment/detachment fixing portions 250 are provided on the rear surface of the bumper 20, a worker on the ground can easily access the attachment/detachment fixing portions 250. Therefore, it is possible to easily perform switching between the fixation state and the fixed state of the movable fence 240.

Other Embodiments

Hereinbefore, the embodiment of the present invention is described. However, the present invention is not limited to this and can be appropriately modified within a scope which does not depart from the technical scope of the present invention.

For example, as shown in FIG. 12, as a modification example of the present embodiment, only one movable fence 240A may be provided in the rear passage R1. In this case, the movable fence 240A extends over the width direction of the rear passage R1. The rotation axis O2 may be positioned on any one of one side and the other side in the width direction. Accordingly, similarly to the embodiment, it is possible to increase the rotation range of the grille 46 or the blower unit 70.

In addition, particularly, similarly to the rotation axis O2 of the grille 46 or the blower unit 70, since the rotation axis O2 of the movable fence 240A is positioned on one side in the width direction, the movable fence 240A at the retreat position does not become an obstacle. That is, since the movable fence 240A at the retreat position is disposed to be closer to one side in the width direction along with the grille 46 or the blower unit 70 in an open state, the space on the other side in the width direction can be largely increased. Accordingly, it is possible to increase a work space.

In the present embodiment, the example is described in which the grille 46 or the blower unit 70 is adopted as the opening and closing portion. However, the present invention is not limited to this, and the present invention may be applied to other opening and closing portions of the vehicle body 110. Even in this case, since the movable fence rotates to the position at which the movable fence 240 is deviated from the operation region of the opening and closing portion, it is possible to secure workability.

Moreover, in the present embodiment, the rotation axis of the grille 46 or the blower unit 70 is the opening and closing axis O2 or the like disposed on one side in the width direction. However, the opening and closing axis may be disposed on the other side in the width direction, and the opening and closing portion of the grille 46, the blower unit 70, or the like may be provided so as to be rotatable around an opening and closing axis which extends in the width direction.

In the embodiment, the pair of movable fences 240 is symmetrically disposed. However, the present invention is not limited to this, and for example, the pair of the movable fences 240 may be unsymmetrical in which the size of one movable fence 240 in the width direction among the pair of movable fences 240 at the normal positions is larger and the size of the other movable fence 240 in the width direction is smaller.

Moreover, only the portion of the fence of the rear passage R1 which interferes with the grille 46 or the blower unit 70 may be the movable fence 240, and other portions thereof may be the fixed fence 200.

In the present embodiment, the rotation range of the movable fence 240 is set to 90° from the normal position. However, the present invention is not limited to this. For example, the rotation range of the movable fence 240 may be smaller or greater than 90° in accordance with the rotatable range of the grille 46 or the blower unit 70. In addition, the work may be performed in a state where the movable fence 240 is not rotated to the retreat position.

The present invention is not limited to the aspect in which the attachment/detachment fixing portions are provided on the rear surface of the vehicle rear portion 130. The attachment/detachment fixing portions 250 may be provided on the rear portion of the vehicle rear portion 130. For example, holes into which the vertical bars 246 are inserted may be formed on the bumper 20 as the attachment/detachment fixing portions.

The example in which the rotation connection portions 210 are fixed to the fixed fence 200 is described. However, the rotation connection portions 210 may be fixed to other portions of the vehicle body 110. That is, any configuration may be adopted as long as the movable fence 240 is rotatably connected to the vehicle body 110 via the rotation connection portions 210.

In the above-described embodiment, the wheel loader 100 is described as one example of the work vehicle of the present invention. However, for example, the present invention may be applied to other work vehicles such as a motor grader as the work vehicle.

INDUSTRIAL APPLICABILITY

According to the work vehicle of the aspect, it is possible to improve maintainability while securing accessibility with respect to the vehicle rear portion or the like.

REFERENCE SIGNS LIST

10: rear frame, 20: bumper, 21: bumper center portion, 21a: upper surface, 22: bumper side portion, 22a: upper surface, 23: accommodation portion, 23a: upper surface, 24a: nonslip mat, 24b: nonslip mat, 30: exterior cover, 31: side cover, 32: top cover, 33 ventilation portion, 35: opening portion, 36: side edge portion, 37: upper edge portion, 38: lower edge portion, 40: support frame, 41: side frame, 42: upper frame, 43: rotating bracket, 44: fixing bracket, 46: grille, 47: an engine, 50: cooling unit, 51: rear surface, 60: fixation shroud, 70: blower unit, 71: movable bracket, 72: rotation support portion, 73: bracket body, 74: vertical frame portion, 75: horizontal frame portion, 76: fixed connection part, 80: fan, 81: hydraulic motor, 82: fan body, 83: attachment portion, 84: blade, 85: guard portion, 90: movable shroud, 100: wheel loader, 110: vehicle body, 120: vehicle front portion, 130: vehicle rear portion, 140: front wheel, 150: rear wheel, 160: cab, 170: fuel tank, 180: work equipment, 181: boom, 182: bucket, 183: boom drive cylinder, 184: bucket drive cylinder, 200: fixed fence, 201: vertical bar, 202: fixing portion, 203: horizontal bar, 204: guard, 210: rotation connection part, 211: support metal fitting, 212: metal fitting body, 213: through-hole, 214: first hook-shaped portion, 215: first arc portion, 216: bolt insertion hole, 217: reinforcement portion, 218: split piece, 219: abutment plate portion, 220: bolt through-hole, 221: second hook-shaped portion, 222: second arc portion, 223: bolt, 224: nut, 225: bush-holding portion, 230: rubber bush (bush), 230a: hole portion, 231: held surface, 232: bearing surface, 240: movable fence, 240A: movable fence, 241: base end shaft, 242: flange, 243: flange portion, 244: horizontal bar, 245: tip shaft, 246: vertical bar, 247: guard, 250: attachment/detachment fixing portion, 251: fixing plate, 252: curved plate, 253: fixing bolt, 261: sleeve, 262: sleeve, 263: sleeve, 271: connection member, 271a: connection piece, 271b: bolt, 272: connection member, 272a: connection piece, 272b: bolt, R: passage, R1: rear passage, R2: side passage, E: engine room, T: heat exchange room, O1: opening and closing axis, O2: rotation axis, P: reference axis

The invention claimed is:

1. A work vehicle, comprising:
   a vehicle body that has a passage including a rear passage through which a worker can pass, the rear passage being provided on a bumper fixed to a rear frame of the vehicle body;
   a movable fence that has a vertical bar extending in a vertical direction and that is disposed at a rear edge of the rear passage and that is rotatably supported to the vehicle body around a rotation axis extending in a vertical direction between a normal position which extends in a width direction of the vehicle body along a rear edge of the rear passage and a retreat position which extends backward from the vehicle body; and a rotation connection portion that connects the movable fence to the vehicle body to be rotatable around the rotation axis, wherein the vehicle body supports the movable fence via the rotation connection portion, wherein a lower end of the vertical bar is positioned to be lower than an upper surface of the rear passage at the normal position, wherein the vehicle body further includes an attachment/detachment fixing portion that is provided on a rear frame of the vehicle body and is configured to detachably fix the lower end of the vertical bar of the movable fence at the normal position, and wherein the movable fence is slidably supported at the vehicle body with the rotation connection portion so that the movable fence can slide vertically to attach and detach the moveable fence with respect to the attachment/detachment fixing portion.

2. The work vehicle according to claim 1, wherein a pair of movable fences are provided, wherein one movable fence is rotatably supported around the rotation axis disposed on one side in a width direction of the rear fence, wherein the other movable fence is rotatably supported around the rotation axis disposed on the other side in a width direction of the rear fence, and wherein tips of the pair of movable fences at the normal position face each other in the width direction.

3. The work vehicle according to claim 2, wherein the vehicle body includes:
an opening portion that faces backward;
the passage that extends along a lower edge portion of the opening portion; and an opening and closing portion that is supported to be openable and closable with respect to the vehicle body between a closed position at which the opening portion is closed and an open position at which the opening portion is open, wherein the movable fence at the normal position is positioned within an operation region of the opening and closing portion, and wherein the movable fence at the retreat position is positioned outside the operation region of the opening and closing portion.

4. The work vehicle according to claim 3, further comprising:

a rotation connection portion that connects the movable fence to the vehicle body to be rotatable around the rotation axis, wherein the vehicle body supports the movable fence via the rotation connection portion, wherein the rotation connection portion includes a bush that has a hole portion penetrating along the rotation axis, wherein the movable fences includes:
a base end shaft that penetrates the hole portion; and
a flange that extends from an outer peripheral surface of the base end shaft and abuts on the bush from above.

5. The work vehicle according to claim 2, further comprising:

a rotation connection portion that connects the movable fence to the vehicle body to be rotatable around the rotation axis, wherein the vehicle body supports the movable fence via the rotation connection portion, wherein the rotation connection portion includes a bush that has a hole portion penetrating along the rotation axis, wherein the movable fences includes:
a base end shaft that penetrates the hole portion; and
a flange that extends from an outer peripheral surface of the base end shaft and abuts on the bush from above.

6. The work vehicle according to claim 2, further comprising:

a cooling unit that is provided inside the vehicle body, and
an opening and closing portion that is supported to be openable and closable with respect to the vehicle body, wherein the opening and closing portion includes
a grille that is rotatably supported with respect to the vehicle body, and
a blower unit that is disposed between the grille and the cooling unit and is rotatably supported with respect to the vehicle body.

7. The work vehicle according to claim 1, wherein the vehicle body includes:
an opening portion that faces backward;
the passage that extends along a lower edge portion of the opening portion; and
an opening and closing portion that is supported to be openable and closable with respect to the vehicle body between a closed position at which the opening portion is closed and an open position at which the opening portion is open, wherein the movable fence at the normal position is positioned within an operation region of the opening and closing portion, and wherein the movable fence at the retreat position is positioned outside the operation region of the opening and closing portion.

8. The work vehicle according to claim 7, further comprising:

a rotation connection portion that connects the movable fence to the vehicle body to be rotatable around the rotation axis, wherein the vehicle body supports the movable fence via the rotation connection portion, wherein the rotation connection portion includes a bush that has a hole portion penetrating along the rotation axis, wherein the movable fences includes:
a base end shaft that penetrates the hole portion; and
a flange that extends from an outer peripheral surface of the base end shaft and abuts on the bush from above.

9. The work vehicle according to claim 7, further comprising:

a cooling unit that is provided inside the vehicle body,
wherein the opening and closing portion includes
a grille that is rotatably supported with respect to the vehicle body, and
a blower unit that is disposed between the grille and the cooling unit and is rotatably supported with respect to the vehicle body.

10. The work vehicle according to claim 1, wherein the rotation connection portion includes a bush that has a hole portion penetrating along the rotation axis, and wherein the movable fences includes:
a base end shaft that penetrates the hole portion; and
a flange that extends from an outer peripheral surface of the base end shaft and abuts on the bush from above.

11. The work vehicle according to claim 10,
wherein the vehicle body further includes a fixed fence that extends along an outer edge of the passage, and
wherein the rotation connection portion is fixed to the fixed fence.

12. The work vehicle according to claim 11, further comprising:
a cooling unit that is provided inside the vehicle body, and
an opening and closing portion that is supported to be openable and closable with respect to the vehicle body,
wherein the opening and closing portion includes
a grille that is rotatably supported with respect to the vehicle body, and
a blower unit that is disposed between the grille and the cooling unit and is rotatably supported with respect to the vehicle body.

13. The work vehicle according to claim 10, further comprising:
a cooling unit that is provided inside the vehicle body, and
an opening and closing portion that is supported to be openable and closable with respect to the vehicle body,
wherein the opening and closing portion includes
a grille that is rotatably supported with respect to the vehicle body, and
a blower unit that is disposed between the grille and the cooling unit and is rotatably supported with respect to the vehicle body.

14. The work vehicle according to claim 10,
wherein the base end shaft is a bar-shaped member extending in the vertical direction,
wherein the base end shaft is disposed to penetrate the hole portion of the bush in the vertical direction, and
wherein the base end shaft is configured to be capable of moving in the vertical direction with respect to the bush to attach and detach the moveable fence to the vehicle body.

15. The work vehicle according to claim 14,
wherein a plurality of the rotation connection portions are disposed on the vehicle body at intervals in the vertical direction.

16. The work vehicle according to claim 14,
wherein the base end shaft has a flange portion on the lower end of the base end shaft, the flange portion extending from the lower end of the base end shaft to an outer peripheral side of the base end shaft.

17. The work vehicle according to claim 1, further comprising:
a cooling unit that is provided inside the vehicle body, and
an opening and closing portion that is supported to be openable and closable with respect to the vehicle body,
wherein the opening and closing portion includes
a grille that is rotatably supported with respect to the vehicle body, and
a blower unit that is disposed between the grille and the cooling unit and is rotatably supported with respect to the vehicle body.

18. The work vehicle according to claim 1,
wherein the movable fence comprises a plurality of the vertical bars,
wherein the number of the attachment/detachment fixing portions corresponds to the number of the plurality of the vertical bars.

19. The work vehicle according to claim 1,
wherein the attachment/detachment fixing portion includes a pair of fixing plates, a curved plate connected to the pair of fixing plates, and a pair of fixing bolts configured to detachably fix the pair of fixing plates on the rear frame of the vehicle body,
wherein the curved plate has a semicircular shape, and a radius of the curved plate is larger than a radius of a circle in a cross section of the vertical bar, and a shape of a cross section of the curved plate is larger than a shape of a cross section of the vertical bar, and
wherein the curved plate of the attachment/detachment fixing portion is an accommodation portion which accommodates and fixes the vertical bar so as to surround an outer surface of at least a portion of the vertical bar of the movable fence when the movable fence is positioned at the normal position.

* * * * *